(12) United States Patent
Girnyk et al.

(10) Patent No.: US 12,176,980 B2
(45) Date of Patent: Dec. 24, 2024

(54) TECHNIQUE FOR DUAL-POLARIZED BEAMFORMING

(71) Applicant: Telefonaktiebolaget LM Ericsson (publ), Stockholm (SE)

(72) Inventors: Maksym Girnyk, Solna (SE); Johan Axnäs, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/026,390

(22) PCT Filed: Sep. 16, 2020

(86) PCT No.: PCT/EP2020/075905
§ 371 (c)(1),
(2) Date: Mar. 15, 2023

(87) PCT Pub. No.: WO2022/058007
PCT Pub. Date: Mar. 24, 2022

(65) Prior Publication Data
US 2023/0387981 A1    Nov. 30, 2023

(51) Int. Cl.
H04B 7/06    (2006.01)
H04B 7/08    (2006.01)
H04B 7/10    (2017.01)

(52) U.S. Cl.
CPC .......... *H04B 7/0617* (2013.01); *H04B 7/086* (2013.01); *H04B 7/10* (2013.01)

(58) Field of Classification Search
CPC ......... H04B 7/0617; H04B 7/086; H04B 7/10
See application file for complete search history.

(56) References Cited

U.S. PATENT DOCUMENTS

2011/0069633 A1*  3/2011  Schmidt ............ H04L 25/03343
                                                        343/893
2012/0212372 A1*  8/2012  Petersson ............... H01Q 21/08
                                                        343/893
(Continued)

FOREIGN PATENT DOCUMENTS

WO    2016/142281 A1    9/2016
WO    2016/163928 A1    10/2016
(Continued)

OTHER PUBLICATIONS

International Search Report and Written Opinion issued in International Application No. PCT/EP2020/075905 dated Jun. 9, 2021 (13 pages).

*Primary Examiner* — Jean B Corrielus
(74) *Attorney, Agent, or Firm* — Rothwell, Figg, Ernst & Manbeck, P.C.

(57) ABSTRACT

A method for performing a beamformed transmission and/or reception in a wireless communication using an antenna array comprising a first sub-array of first antenna elements each having a first polarization and a second sub-array of second antenna elements each having a second polarization that is orthogonal to the first polarization is provided. The method comprises obtaining a first weight vector for the first sub-array and a second weight vector for the second sub-array. The first weight vector and the second weight vector optimize a utility function. The utility function comprises a first term depending on a first function of the first weight vector and on a second function of the second weight vector. The utility function further comprises a second term depending on either one of the first function and the second function. Performing the beamformed transmission using the obtained first weight vector and the second weight vector.

18 Claims, 11 Drawing Sheets

(56) References Cited

U.S. PATENT DOCUMENTS

2016/0301458 A1* 10/2016 Petersson ............... H01Q 21/26
2021/0211170 A1* 7/2021 Lai ...................... H04B 7/0617

FOREIGN PATENT DOCUMENTS

WO   2017/190777 A1   11/2017
WO   2017/190811 A1   11/2017

* cited by examiner

TECHNIQUE FOR DUAL-POLARIZED BEAMFORMING

CROSS REFERENCE TO RELATED APPLICATIONS

This application is a 35 U.S.C. § 371 National Stage of International Patent Application No. PCT/EP2020/075905, filed 2020 Sep. 16.

TECHNICAL FIELD

The present disclosure relates to a technique for dual-polarized beamforming. More specifically, and without limitation, methods and devices are provided for performing beamformed transmissions and/or beamformed receptions using an antenna array comprising two sub-arrays of antenna elements with mutually orthogonal polarizations.

BACKGROUND

The evolution of Fifth Generation (5G) communication systems, e.g., as specified by the Third Generation Partnership Project (3GPP), includes extremely large antenna arrays with the aim of increasing throughput and robustness of transmissions. With the use of practically available reconfigurable antenna systems, such large antenna arrays can be manipulated to shape energy radiation patterns into "beams" (the so-called beamforming). The obtained beams can be steered towards a particular radio device (e.g., a user equipment, UE), increasing its signal-to-noise ratio, and thereby improving its experience (e.g., in terms of data rates). The gains achievable by such UE-specific beamforming are promising and seem to be of great importance to achieve the goals of future radio networks, e.g. in terms of throughput.

At the same time, apart from creating (e.g., narrow) UE-specific beams, a base station must be capable of also creating wide cell-specific beams to cover the entire sector and/or cell it is serving with a desired level of radiation. This covering of the entire sector and/or cell might be needed, e.g., for sending broadcast information or common reference signals.

Conventional approaches to address the issue of beamforming for wide beams include a separate wide-beam antenna that may be used for transmission of broadcast data. A drawback with this approach is that it requires additional hardware.

Alternatively, broadcast data may be transmitted using a single antenna array element, or sub-array, of the antenna array. This array element or sub-array has a wider beam than the full array of the antenna array. A drawback of this approach is that only one, or a few, power amplifiers (PAs) of the antenna array or antenna system is/are utilized, which wastes power resources.

Further alternatively, amplitude and/or phase tapering is used over the full array of the antenna to widen the beam. Drawbacks with such tapering are that amplitude tapering gives poor utilization of the PA resources, and that it is in many cases not possible to synthesize the desired beam shape using phase-only beamforming.

Still further alternatively, broadcast data is transmitted sequentially in different directions using narrow beams. A potential drawback with this approach is that this takes longer time and consumes more resource elements than transmitting broadcast data simultaneously in all directions with a wide beam.

Construction of wide beams by a large antenna array with an antenna is also relevant to THz communications, in which case, due to the increased propagation loss at such high frequencies, high gain beam forming is needed to retain the link budget, e.g. both at the receiver and transmitter. Beamforming is needed since the dominant propagation paths between a transmitter and a receiver are typically not known a priori. Testing all combinations of a large number of narrow transmit and receive beams in order to find the best beam pair consumes a prohibitive amount of time and/or frequency resources. A way to resolve this issue is utilization of the so-called differential beamforming. In differential beamforming, a base station starts a search procedure with wide beams and then make the beams narrower and narrower until the best pair of narrow beams has been found. Such a beam finding procedure generally requires means for generating beams with different beam widths in a flexible manner. In order to fully utilize the antenna array and the available PA resource, it is desirable to use all antenna elements and all PAs at full power when transmitting beams with different beam widths.

A still further conventional approach to beamforming for widebeams uses the construction of a special cell-specific beam, exploiting the polarization domain. For instance, in WO 2017/190811 A1, the beam pattern is formed as a sum of two per-polarization beams. The weights of such beams are designed with the help of Golay complementary sequences.

Conventionally, each per-polarization beam pattern exhibits deep nulls and/or severe power dips at predefined azimuthal angles, which degrade the channel estimation and link performance, in particular for a UE moving at high speed along the azimuthal direction.

SUMMARY

Accordingly, there is a need for a beamforming technique that improves channel estimation and/or link performance, in particular in high-mobility scenarios and/or per polarization. Alternatively or in addition, there is a need for a beamforming technique that lowers the directional changes and/or directional variations of the radiation pattern per polarization.

As to a first method aspect, a method of performing a beamformed transmission in a wireless communication using an antenna array is provided. The antenna array comprises a first sub-array of first antenna elements, each having a first polarization, and a second sub-array of second antenna elements, each having a second polarization that is orthogonal to the first polarization. The method comprises or initiates a step of obtaining a first weight vector for the first sub-array and a second weight vector for the second sub-array. The first weight vector and the second weight vector optimize a utility function. The utility function comprises a first term depending on a first function of the first weight vector and on a second function of the second weight vector. The utility function further comprises a second term depending on either one of the first function and the second function. The method further comprises or initiates a step of performing the beamformed transmission using the obtained first weight vector for the first sub-array of antenna elements and the obtained second weight vector for the second sub-array of antenna elements.

Beamforming using two orthogonal polarizations may also be denoted as dual-polarized beamforming. Alternatively or in addition, the orthogonality of the polarizations may relate to or may be defined by a scalar product of the two polarizations and/or a spatial orientation of the first and second antenna elements. Further alternatively or in addition, the first polarization and the second polarization may each comprise a linear polarization with the oscillation directions of, e.g., the electric components and/or the antenna elements, being orthogonal. Further alternatively or in addition, the first polarization and the second polarization may comprise a left-hand circular polarization and a right-hand circular polarization, respectively.

Each antenna element of the first sub-array of antenna elements may be assigned equal power. Alternatively or in addition, each antenna element of the second sub-array of antenna elements may be assigned equal power.

Embodiments of the beamforming technique disclosed herewith may (e.g., selectively) transmit and/or receive broad beams. Same of further embodiments may be applied in high-mobility scenarios between a transmitter performing first method aspect and a receiver.

The wireless communication may comprise an uplink and/or a downlink (e.g., between a network node and a radio device) in a network (e.g., a radio access network) and/or a sidelink (e.g., between a radio devices) in a network (e.g., a mesh network or ad hoc network).

Obtaining the first weight vector and/or the second weight vector may comprise receiving, e.g. over the network and/or a radio interface (also referred to as air interface) the first weight vector and/or the second weight vector from a (e.g., remote) central unit dedicated to determining the first weight vector and/or the second weight vector. Alternatively or in addition, obtaining the first weight vector and/or the second weight vector may comprise determining (e.g., computing) the first weight vector and/or the second weight vector locally at a transmitting and/or receiving device. Further alternatively or in addition, obtaining the first weight vector and/or the second weight vector may comprise implementing and/or storing and/or retrieving one or more (e.g., tabulated) sets of first weight vectors and second weight vectors upon deployment of the transmitting and/or receiving device.

The first weight vector may comprise a plurality of weights (e.g., complex numbers). Each of the weights in the first weight vector may be associated with a different one of the first antenna elements in the first sub-array. The second weight vector may comprise a plurality of weights (e.g., complex numbers). Each of the weights in the second weight vector may be associated with a different one of the second antenna elements in the second sub-array.

Each of the antenna elements may correspond to an antenna port.

The first and/or second weight vector of each of the first and/or the second sub-array of antenna elements, respectively, may be normalized. E.g., the weight vector of a sub-array comprising N antenna elements may have norm N. Alternatively or in addition, obtaining the first and/or second weight vector may comprise obtaining a complex phase of each entry of the weight vector (e.g. a vector of complex phases) corresponding to a given one antenna element within the sub-array of antenna elements. Further alternatively or in addition, each entry of the first and/or second weight vector may be normalized, e.g. have unit norm.

Optimizing the utility function may reduce or prevent nulls of an angular power pattern of each of the first sub-array and the second sub-array or may reduce a variance of an angular power pattern of each of the first sub-array and the second sub-array, e.g., compared to an angular power pattern of each of the first sub-array and the second sub-array resulting from optimizing only the first term.

Herein, the angular power pattern (also briefly: power pattern) may be a transmit power pattern (e.g., in the context of the first method aspect) and/or a receive power pattern (e.g., in the context of a second method aspect).

The first term of the utility function may, e.g. upon optimization solely based on the first term, lead to (e.g., result in or produce) a set of first and second weight vectors of the first and second sub-array, respectively, such that a (e.g., transmit or receive) power pattern of the antenna array is equivalent to a (e.g., transmit or receive) power pattern of a single antenna (e.g., a single antenna element). For example, the power pattern (e.g., transmit power pattern or receive power pattern) resulting from or produced by optimizing (e.g., minimizing) the first term only may correspond to the power pattern (e.g., transmit power pattern or receive power pattern) of a single antenna (e.g., a single antenna element).

Herein, being equivalent may encompass being (e.g., approximately) equal or identical, optionally up to a scaling factor.

The (e.g., transmit or receive) power pattern of the antenna array (e.g., resulting from applying the first weight vector and the second weight vector and/or comprising both the first and second sub-arrays) may also be referred to as a total power pattern.

Herein, the angular power pattern (e.g., transmit or receive power pattern) may correspond to an angular power distribution (e.g., an azimuthal power distribution). Disclosure as to the transmit power pattern may imply a corresponding disclosure for a receive power pattern. The expression "power pattern" may also be referred to as (e.g., angular) characteristic or (e.g., angular) power gain.

Optimizing the utility function may lead to (e.g., produce or result in) a first angular power pattern of the first sub-array and a second angular power pattern of the second sub-array. Optimizing (e.g., hypothetically) only the first term may lead to (e.g., produce or result in) a third angular power pattern of the first sub-array and a fourth angular power pattern of the second sub-array.

In a first exemplary implementation, an angular variance of each of the first angular power pattern and the second angular power pattern may be less than an angular variance of each of the third angular power pattern and the fourth angular power pattern.

In a second exemplary implementation (which may be combined with the first exemplary implementation), a number of minima of each of the first angular power pattern and the second angular power pattern below a predefined fraction of the angular power pattern of a single antenna element may be less than a number of minima of each of the third angular power pattern and the fourth angular power pattern below the predefined fraction of the angular power pattern of a single antenna element. The predefined fraction may be 50% or 90% or a value between 60% and 80%.

In a third exemplary implementation (which may be combined with the first exemplary implementation and/or the second exemplary implementation), the sum of an angular range of each of the first angular power pattern and the second angular power pattern below a predefined fraction of the angular power pattern of a single antenna element may be less than the sum of an angular range of each of the third angular power pattern and the fourth angular power pattern below the predefined fraction of the angular power pattern of a single antenna element. The predefined fraction may be 50% or 90% or a value between 60% and 80%.

The fraction may be defined relative to an angular maximum of the power pattern. For example, if the power of the first sub-array is N-times power of a single antenna element, the fraction may account for the factor N.

The second term may pointwise and/or piecewise depend on either one of the first function and the second function. For example, the second term may depend on either one of the first function and the second function at each point in the 2N-dimensional vector space of the combined first and second weight vectors. Alternatively or in addition, the second term may selectively depend on (e.g., either one of) the first function and the second function. The selectivity may relate to a position within the 2N-dimensional vector space of the combined first and second weight vectors. For example, the 2N-dimensional vector space may be partitioned into a first set and a second set (e.g., the first set and the second set being disjoint), wherein the second term depends exclusively on the first function in the first set and the second term depends exclusively on the second function in the second set. Alternatively or in addition, the second term does not depend on the same one of the first function and the second function throughout the full range of the first and second weight vectors.

The first weight vector and the second weight vector may asymptotically optimize the utility function. Alternatively or in addition, the obtained (e.g., determined or received) first weight vector and the obtained (e.g., determined or received) second weight vector may result from an iterative optimizations of the utility function, wherein the iterative optimizations is terminated after a finite number of iterations. The iterative optimization may be terminated after a predefined number of iterations and/or when increments (or decrements) of the utility function during the successive iterations are less than a predefined threshold value.

Optimizing the utility function may comprise (e.g., asymptotically) maximizing the (e.g. negative valued) utility function in dependence of (e.g. complex) phases of the first weight vector and the second weight vector. Alternatively or in addition, optimizing the utility function may comprise (e.g., asymptotically) minimizing the absolute value of the utility function in dependence of the (e.g. complex) phases of the first weight vector and the second weight vector.

The transmit power of each of the first and the second sub-array (and/or the transmit power of each of the first and the second polarization) may, upon optimization of the first term of the utility function, comprise deep nulls and/or power dips (also denoted as power lows) along predetermined angular (e.g. azimuthal) directions. Alternatively or in addition, the transmit power of each of the second and the first sub-array (and/or the transmit power of each of the second and the first polarization) may, upon optimization of the first term of the utility function, comprise local maxima along predetermined (e.g. different from the above pertaining to deep nulls and/or power dips) angular (e.g. azimuthal) directions. Further alternatively or in addition, the sum of the transmit powers of the first and the second sub-array (and/or of the first and the second polarizations) may be a continuous (e.g. concave) function of the angular (e.g. azimuthal) direction.

By optimizing the utility function comprising the first term and the second term, deep nulls and/or power dips of the transmit power per sub-array and/or per polarization may be mitigated.

By mitigating power dips and/or deep nulls per polarization and/or per sub-array, channel estimation and link performance can be improved, in particular in high-mobility scenarios, e.g. for a receiver moving perpendicular to the direction of propagation of the beam.

The utility function may comprise a sum of the first term $U_j(\varphi)$ and of the second term $U_t(\varphi)$ with a mixing parameter $0 \leq q < 1$ among the two terms and an exponent $\beta$ (e.g. $\beta > 0$) weighting the second term, e.g. $U(\varphi) = (1-q)U_j(\varphi) + qU_t^\beta(\varphi)$, wherein $\varphi$ denotes the (vector of) phases of the first and the second weight vectors.

The transmit power pattern of each antenna element within the first sub-array may be equal. Alternatively or in addition, the transmit power pattern of each antenna element within the second sub-array may be equal.

An equal transmit power pattern may be represented by an equal norm (or absolute value) of each entry of the weight vector of the respective sub-array. For example, the weights in the first and the second weight vectors may be complex numbers of absolute value 1.

Optimizing (e.g., only) the first term (e.g., of the utility function) may produce or result in a total (e.g., transmit or receive) power pattern of the antenna array equivalent (e.g., approximately identical up to scaling) to the (e.g., transmit or receive) power pattern of a single antenna element within the antenna array.

The first sub-array may comprise a linear array of the antenna elements and/or a two-dimensional array of the antenna elements. Alternatively or in addition, the second sub-array may comprise a linear array of the antenna elements and/or a two-dimensional array of the antenna elements.

The first sub-array and the second sub-array may be spaced apart. Alternatively or in addition, the first sub-array and the second sub-array may at least partially be co-localized. For example, the antenna elements of the first sub-array and of the second sub-array may be arranged and/or positioned alternatingly.

The first sub-array and the second sub-array may comprise an equal number of antenna elements.

The first function may exclusively depend on the first weight vector. The first function may be independent of the second weight vector. Alternatively or in addition, the second function may exclusively depend on the second weight vector. The second function may be independent of the first weight vector.

The first function of the first weight vector may comprise an (e.g., aperiodic) autocorrelation function. Alternatively or in addition, the second function of the second weight vector may comprise an (e.g., aperiodic) autocorrelation function.

The first function may comprise an (e.g., aperiodic) autocorrelation function of the (e.g., phases of the) first weight vector. For example, the first weight vector may be auto-correlated as a function of an offset value. An aperiodic autocorrelation function (AACF) may be denoted as $R_{w_A}(\tau)$ for an integer $\tau$ (e.g., the offset value) and the first weight vector $w_A$ of the first sub-array. The second function may comprise an (e.g., aperiodic) autocorrelation function of the (e.g., phases of the) second weight vector. For example, the second weight vector may be auto-correlated as a function of an offset value. An AACF may be denoted as $R_{w_B}(\tau)$ for an integer t (e.g., the offset value) and the second weight vector $w_B$ of the second sub-array.

The first term of the utility function may comprise a p-norm of a sum of the first function and of the second function.

The first term $U_j(\varphi)$ may read $$U_j(\varphi) = -\sqrt[p]{\sum_{\tau=1}^{M-1} |R_{w_A}(\tau) + R_{w_B}(\tau)|^p},$$

wherein $w_A$ and $w_B$ are the first weight vector and the second weight vector of the first sub-array and the second sub-array, respectively. A vector $\varphi$ may comprise the (e.g. complex) phases of both the first and second weight vectors, e.g. as a vector of length $N_A+N_B$, wherein $N_A$ and $N_B$ denote the size of the (e.g. linear) first sub-array and the (e.g. linear) second sub-array, respectively.

The second term may depend on either one of the first function and the second function depending on the first weight vector and the second weight vector, respectively. Alternatively or in addition, the second term may depend on the first weight vector and the second weight vector through either one of the first function and the second function.

The dependence of the second term on either the first function or the second function may vary and/or change while optimizing the utility function in dependence of the first weight vector and the second weight vector.

The second term may depend on the maximum or the minimum of a p-norm of the first function and of a p-norm of the second function (e.g., depending on the first weight vector and the second weight vector, respectively).

The second term $U_i(\varphi)$ may be of the form $U_i(\varphi)=U_i(\varphi_A, \varphi_B)=\max\{f_1(\varphi_A),f_2(\varphi_B)\}=-\min\{-f_1(\varphi_A),-f_2(\varphi_B)\}$, wherein $w_A$ and $w_B$ are the weight vectors of the first and the second sub-array, respectively, and $\varphi_A$ and $\varphi_B$ comprises the phases of the first weight vector and the second weight vector, respectively. The phases may be represented by a combined phase vector $\varphi$, e.g. as a vector of length $N_A+N_B$, wherein $N_A$ and $N_B$ denote the size of the (e.g. linear) first and second sub-array, respectively.

The dependence of the second term on the first function may be $$\sqrt[p]{\sum_{\tau=1}^{M-1}|R_{w_A}(\tau)|^p},$$

wherein the first function $R_{w_A}(\tau)$ is an (e.g. aperiodic) autocorrelation function of the first weight vector $w_A$. The dependence of the second term on the second function may be $$\sqrt[p]{\sum_{\tau=1}^{M-1}|R_{w_A}(\tau)|^p},$$

wherein $R_{w_B}(\tau)$ is an (e.g., aperiodic) autocorrelation function of the second weight vector.

The second term, $U_i(\varphi)$, may read or correspond to $$U_i(\varphi) = -\max\left\{\sqrt[p]{\sum_{\tau=1}^{M-1}|R_{w_A}(\tau)|^p}, \sqrt[p]{\sum_{\tau=1}^{M-1}|R_{w_B}(\tau)|^p}\right\},$$

wherein $\varphi$ denotes the combined vector of the phases of the first weight vector $w_A$ and the second weight vector $w_B$.

Upon optimizing the utility function comprising the first term and the second term, the dependence of the second term on either the first weight vector or the second weight vector may change depending the first weight vector and the second weight vector, e.g., depending on which one of the p-norm of the first function and the p-norm of the second function is greater than the other one.

Optimizing the utility function may comprise a Great Deluge (DG) algorithm. Alternatively or in addition, optimizing the utility function may comprise a cyclic algorithm new for complementary sequences (CANARY). Further alternatively or in addition, optimizing the utility function may comprise a majorization-minimization (MM) algorithm. Still further alternatively or in addition, optimizing the utility function may comprise a simulated annealing (SA) algorithm.

The method may further comprise or initiate a step of determining the first weight vector for the first sub-array and the second weight vector for the second sub-array by optimizing the utility function.

The first method aspect may be implemented at or by a network node. The network node may comprise or control the antenna array (also: antenna system) comprising the antenna elements, e.g., 100 or more antenna elements. The network node and/or the antenna array of the network node may be configured for massive multiple-input multiple output (MIMO) radio communication. Alternatively or in addition, the first method aspect may be implemented at or by a radio device. The radio device may comprise at least two antenna elements, e.g., 4 or 6 or 8 antenna elements.

As to a second method aspect, a method of performing a beamformed reception in a wireless communication using an antenna array is provided. The antenna array comprises a first sub-array of first antenna elements, each having a first polarization, and a second sub-array of second antenna elements, each having a second polarization that is orthogonal to the first polarization. The method comprises or initiates a step of obtaining a first weight vector for the first sub-array and a second weight vector for the second sub-array. The first weight vector and the second weight vector optimize a utility function. The utility function comprises a first term depending on a first function of the first weight vector and on a second function of the second weight vector. The utility function further comprises a second term depending on either one of the first function and the second function. The method further comprises or initiates a step of performing the beamformed reception using the obtained first weight vector for the first sub-array of antenna elements and the obtained second weight vector for the second sub-array of antenna elements.

The second method aspect may be implemented at or by a network node. The network node may comprise or control the antenna array (also: antenna system) comprising the antenna elements, e.g., 100 or more antenna elements. The network node and/or the antenna array of the network node may be configured for massive MIMO radio communication. Alternatively or in addition, the second method aspect may be implemented at or by a radio device. The radio device may comprise at least two antenna elements, e.g., 4 or 6 or 8 antenna elements.

The second method aspect may further comprise any feature, or may comprise or initiate any step, disclosed in the context of the first method aspect or may comprise a feature or step corresponding thereto. For example, the first function of the first weight vector and the second function of the second weight vector may each comprise an (e.g. aperiodic) autocorrelation function of the respective weight vector. Still further exemplary, the first term of the utility function may comprise a p-norm of the sum of the first and the second function, and the second term may comprise a maximum of the p-norms of either one of the first function and the second function.

Moreover, the first method aspect may be performed at or by a transmitting station (briefly: transmitter), e.g., a base station for a downlink or a radio device for an uplink or a sidelink connection. Alternatively, or in combination, the second method aspect may be performed at or by a receiving station (briefly: receiver), e.g., a base station for an uplink or a radio device for a downlink or a sidelink connection.

The channel or link used for the data transmission and the radio reception, i.e., the channel between the transmitter and the receiver may comprise multiple subchannels or subcarriers (as a frequency domain). Alternatively, or in addition, the channel or link may comprise one or more slots for a plurality of modulation symbols (as a time domain). Alternatively, or in addition, the channel or link may comprise a directional transmission (also: beamformed transmission) at the transmitter, a directional reception (also: beamformed reception) at the receiver or a multiple-input multiple-output (MIMO) channel with two or more spatial streams (as a spatial domain).

The transmitter and the receiver may be spaced apart. The transmitter and the receiver may be in data or signal communication exclusively by means of the radio communication.

In any aspect, the transmitter and the receiver may form, or may be part of, a radio network, e.g., according to the Third Generation Partnership Project (3GPP) or according to the standard family IEEE 802.11 (Wi-Fi). The radio network may be a radio access network (RAN) comprising one or more base stations. Alternatively, or in addition, the radio network may be a vehicular, ad hoc and/or mesh network. The first method aspect may be performed by one or more embodiments of the transmitter in the radio network. The second method aspect may be performed by one or more embodiments of the receiver in the radio network.

Any of the network nodes may be or may comprise a base station or a cell of the RAN.

Any of the radio devices may be a mobile or wireless device, e.g., a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with any of the base stations. Herein, the base station may encompass any station that is configured to provide radio access to any of the radio devices. The base stations may also be referred to as transmission and reception point (TRP), radio access node or access point (AP). The base station or one of the radio devices functioning as a gateway (e.g., between the radio network and the RAN and/or the Internet) may provide a data link to a host computer providing the data. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a first device aspect, a device for performing a beamformed transmission in a wireless communication using an antenna array comprising a first sub-array of first antenna elements each having a first polarization and a second sub-array of second antenna elements each having a second polarization that is orthogonal to the first polarization is provided. The device may be configured to perform any one of the steps of the first method aspect. Alternatively, or in addition, the device may comprise a weight vector obtaining unit configured to obtain a first weight vector for the first sub-array and a second weight vector for the second sub-array. The first weight vector and the second weight vector optimize a utility function. The utility function comprises a first term depending on a first function of the first weight vector and on a second function of the second weight vector. The utility function further comprises a second term depending on either one of the first function and the second function. The device may further comprise a beamformed transmitting unit configured to perform the beamformed transmission using the obtained first weight vector for the first sub-array of antenna elements and the obtained second weight vector for the second sub-array of antenna elements.

The device may comprise a network node. Alternatively or in addition, the device may comprise a radio device.

Herein, a network node may also be denoted as base station. Alternatively or in addition, a radio device may also be denoted as user equipment (UE).

As to a second device aspect, a device for performing a beamformed reception in a wireless communication using an antenna array comprising a first sub-array of first antenna elements each having a first polarization and a second sub-array of second antenna elements each having a second polarization that is orthogonal to the first polarization is provided. The device may be configured to perform any one of the steps of the second method aspect. Alternatively, or in addition, the device may comprise a weight vector obtaining unit configured to obtain a first weight vector for the first sub-array and a second weight vector for the second sub-array. The first weight vector and the second weight vector optimize a utility function. The utility function comprises a first term depending on a first function of the first weight vector and on a second function of the second weight vector. The utility function further comprises a second term depending on either one of the first function and the second function. The device may further comprise a beamformed receiving unit configured to perform the beamformed reception using the obtained first weight vector for the first sub-array of antenna elements and the obtained second weight vector for the second sub-array of antenna elements.

The device may comprise a network node. Alternatively or in addition, the device may comprise a radio device.

As to a further first device aspect, a device for performing a beamformed transmission in a wireless communication using an antenna array comprising a first sub-array of first antenna elements each having a first polarization and a second sub-array of second antenna elements each having a second polarization that is orthogonal to the first polarization is provided. The device comprises processing circuitry (e.g., at least one processor) and memory. Said memory may comprise (e.g., may be operable to store) instructions executable by said processing circuitry whereby the device is operative to obtain a first weight vector for the first sub-array and a second weight vector for the second sub-array. The first weight vector and the second weight vector optimize a utility function. The utility function comprises a first term depending on a first function of the first weight vector and on a second function of the second weight vector. The utility function further comprises a second term depending on either one of the first function and the second function. The device is further operative to perform the beamformed transmission using the obtained first weight vector for the first sub-array of antenna elements and the obtained second weight vector for the second sub-array of antenna elements.

The device may comprise a network node. Alternatively or in addition, the device may comprise a radio device.

The device may be further operative to perform any of the steps of the first method aspect.

As to a further second device aspect, a device for performing a beamformed reception in a wireless communication using an antenna array comprising a first sub-array of first antenna elements each having a first polarization and a second sub-array of second antenna elements each having a second polarization that is orthogonal to the first polarization is provided. The device comprises processing circuitry (e.g., at least one processor) and a memory. Said memory may comprise (e.g., may be operable to store) instructions executable by said at least one processor whereby the device is operative to obtain a first weight vector for the first sub-array and a second weight vector for the second sub-array. The first weight vector and the second weight vector optimize a utility function. The utility function comprises a first term depending on a first function of the first weight vector and on a second function of the second weight vector. The utility function further comprises a second term depending on either one of the first function and the second function. The device is further operative to perform the beamformed reception using the obtained first weight vector for the first sub-array of antenna elements and the obtained second weight vector for the second sub-array of antenna elements.

The device may comprise a network node. Alternatively or in addition, the device may comprise a radio device.

The device may be further operative to perform any of the steps of the second method aspect.

As to a still further aspect, a communication system including a host computer is provided. The host computer may comprise a processing circuitry configured to provide user data, e.g., depending on a location of the. The host computer may further comprise a communication interface configured to forward user data to a cellular network for transmission to a user equipment (UE), wherein the communication system comprises a base station or a radio device functioning as a gateway configured to communicate with the UE. The processing circuitry of the base station or the radio device is configured to execute any one of the steps of the first method aspect and/or the second method aspect.

The communication system may further include the UE. The UE may comprise a radio interface and processing circuitry. The processing circuitry of the UE may be configured to execute any one of the steps of the first method aspect and/or the second method aspect.

The processing circuitry of the host computer may be configured to execute a host application, thereby providing the user data and/or any host computer functionality described herein. Alternatively, or in addition, the processing circuitry of the UE may be configured to execute a client application associated with the host application.

Any one of the devices, the UE, the base station, the system or any node or station for embodying the technique may further include any feature disclosed in the context of the method aspects, and vice versa. Particularly, any one of the units and modules, or a dedicated unit or module, may be configured to perform or initiate one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including 3GPP LTE (e.g., LTE-Advanced or a related radio access technique such as MulteFire), in a Wireless Local Area Network (WLAN) according to the standard family IEEE 802.11, for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
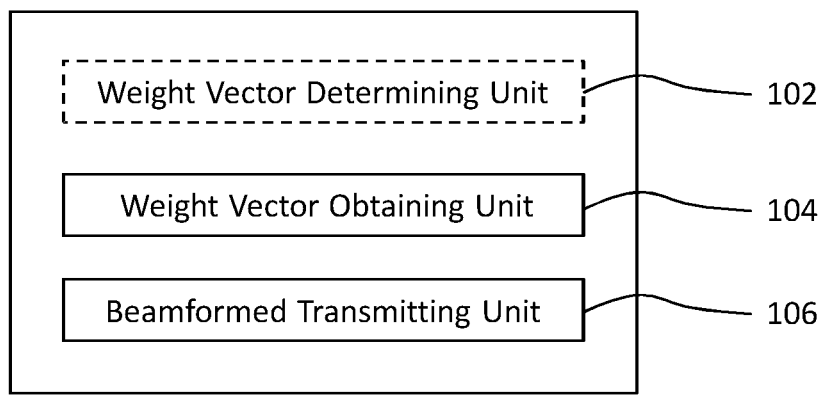
FIG. 1 shows a schematic block diagram of an embodiment of a device for performing a beamformed transmission in a wireless communication using an antenna array comprising two sub-arrays of antenna elements with mutually orthogonal polarizations.

FIG. 1 schematically illustrates an example block diagram of a device for performing a beamformed transmission in a wireless communication, e.g., a device for radio transmitting data using dual-polarized beamforming. The device is generically referred to by reference sign 100.

The beamformed transmission (e.g., the dual-polarized beamforming) uses an antenna array. Optionally, the device 100 comprises the antenna array.

The antenna array comprises a first sub-array of first antenna elements. Each of the first antenna elements has a first polarization. The first polarizations of all first antenna elements may be equal or parallel. The antenna array further comprises a second sub-array of second antenna elements. Each of the second antenna elements has a second polarization that is orthogonal to the first polarization.

The device 100 comprises a weight vector obtaining unit 104 that is configured to obtain a first weight vector for the first sub-array and a second weight vector for the second sub-array. The first weight vector and the second weight vector optimize a utility function. The utility function comprises a first term depending on a first function of the first weight vector and on a second function of the second weight vector. The utility function further comprises a second term depending on either one of the first function and the second function. The device 100 further comprises a beamformed transmitting unit 106 that is configured to perform the beamformed transmission using the obtained first weight vector for the first sub-array of antenna elements and the obtained second weight vector for the second sub-array of antenna elements.

Optionally, the device 100 further comprises a weight vector determining unit 102 that is configured to determine the first weight vector for the first sub-array and the second weight vector for the second sub-array by optimizing the utility function.

Any of the units of the device 100 may be implemented by modules configured to provide the corresponding functionality.

The device 100 may also be referred to as, or may be embodied by, a transmitting station or a transmitter. The device 100 and a corresponding receiver may be in direct radio communication, e.g., at least for the beamformed transmission (e.g., a data transmission) at the device 100.

Figure 2:
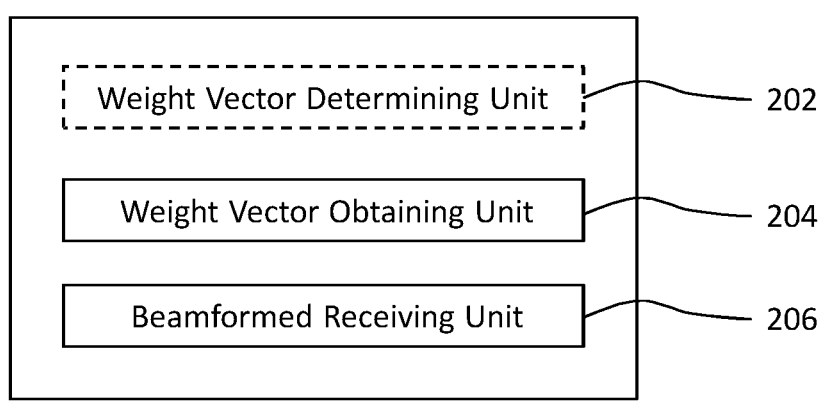
FIG. 2 shows a schematic block diagram of an embodiment of a device for performing beamformed reception in a wireless communication using an antenna array comprising two sub-arrays of antenna elements with mutually orthogonal polarizations.

FIG. 2 schematically illustrates an example block diagram of a device for performing a beamformed reception in a wireless communication, e.g., a device for radio receiving data using dual-polarized beamforming. The device is generically referred to by reference sign 200.

The device 200 comprises a weight vector obtaining unit 204 configured to obtain a first weight vector for the first sub-array and a second weight vector for the second sub-array. The first weight vector and the second weight vector optimize a utility function. The utility function comprises a first term depending on a first function of the first weight vector and on a second function of the second weight vector. The utility function further comprises a second term depending on either one of the first function and the second function. The device 200 further comprises a beamformed receiving unit 206 configured to perform the beamformed reception using the obtained first weight vector for the first sub-array of antenna elements and the obtained second weight vector for the second sub-array of antenna elements.

Optionally, the device 200 further comprises a weight vector determining unit 202 that is configured to determine the first weight vector for the first sub-array and the second weight vector for the second sub-array by optimizing the utility function.

Any of the units of the device 200 may be implemented by modules configured to provide the corresponding functionality.

The device 200 may also be referred to as, or may be embodied by, a receiving device or a receiver. The device 200 and a transmitter of the data are in a radio communication at least for the data reception at the device 200.

Figure 3:
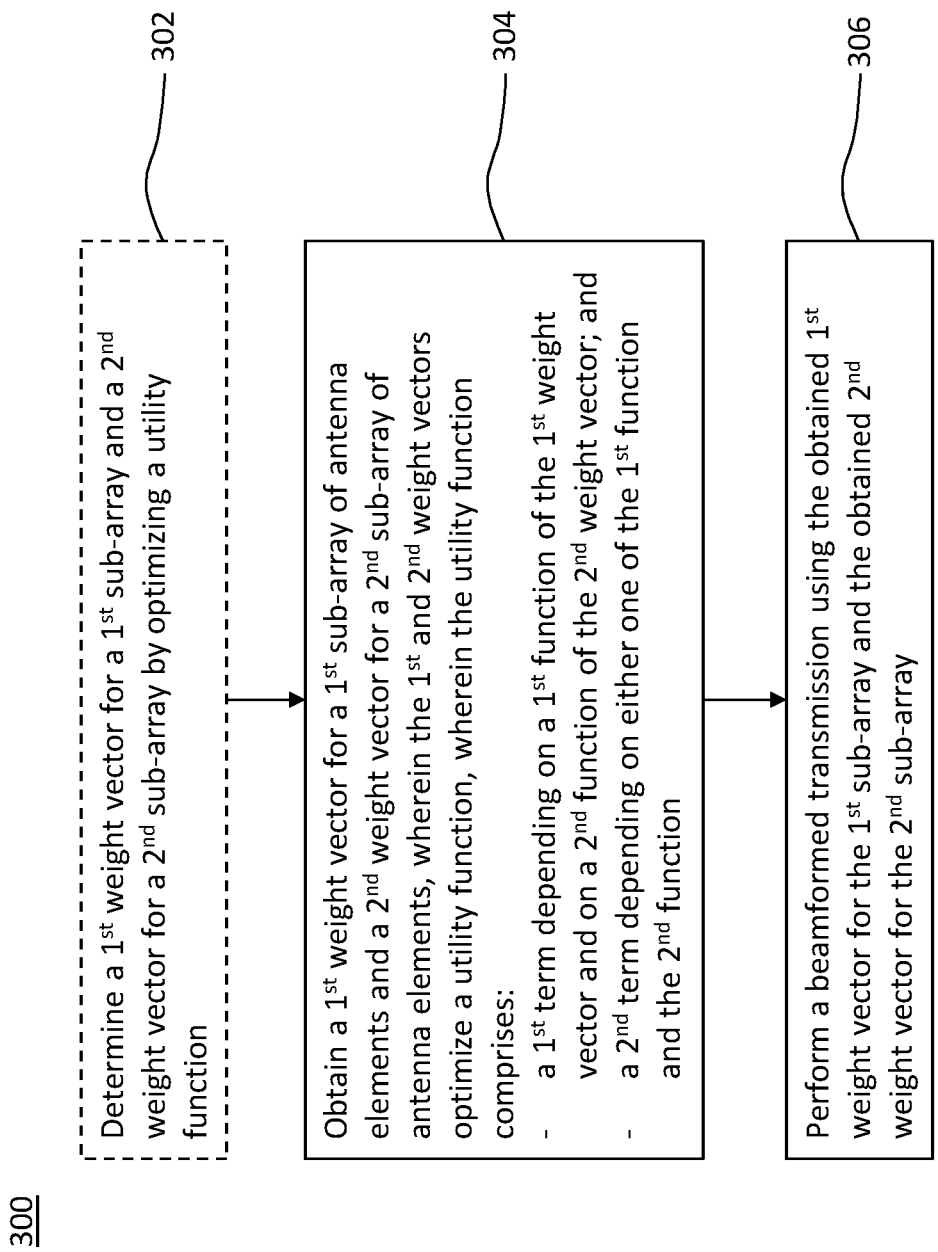
FIG. 3 shows an example flowchart for a method of performing a beamformed transmission in a wireless communication using an antenna array comprising two sub-arrays of antenna elements with mutually orthogonal polarizations, which method may be implementable by the device of FIG. 1.

FIG. 3 shows an example flowchart for a method 300 of performing a beamformed transmission in a wireless communication using an antenna array comprising a first sub-array of first antenna elements each having a first polarization and a second sub-array of second antenna elements each having a second polarization that is orthogonal to the first polarization. The method 300 comprises or initiates a step 304 of obtaining a first weight vector for the first sub-array and a second weight vector for the second sub-array. The first weight vector and the second weight vector optimize a utility function. The utility function comprises a first term depending on a first function of the first weight vector and on a second function of the second weight vector. The utility function further comprises a second term depending on either one of the first function and the second function. The method 300 further comprises or initiates a step 306 of performing the beamformed transmission using the obtained first weight vector for the first sub-array of antenna elements and the obtained second weight vector for the second sub-array of antenna elements.

Optionally, the method 300 further comprises or initiates a step 302 of determining the first weight vector for the first sub-array and the second weight vector for the second sub-array by optimizing the utility function.

The method 300 may be performed by the device 100. For example, the units 102, 104 and 106 may perform the steps 302, 304 and 306, respectively.

Figure 4:
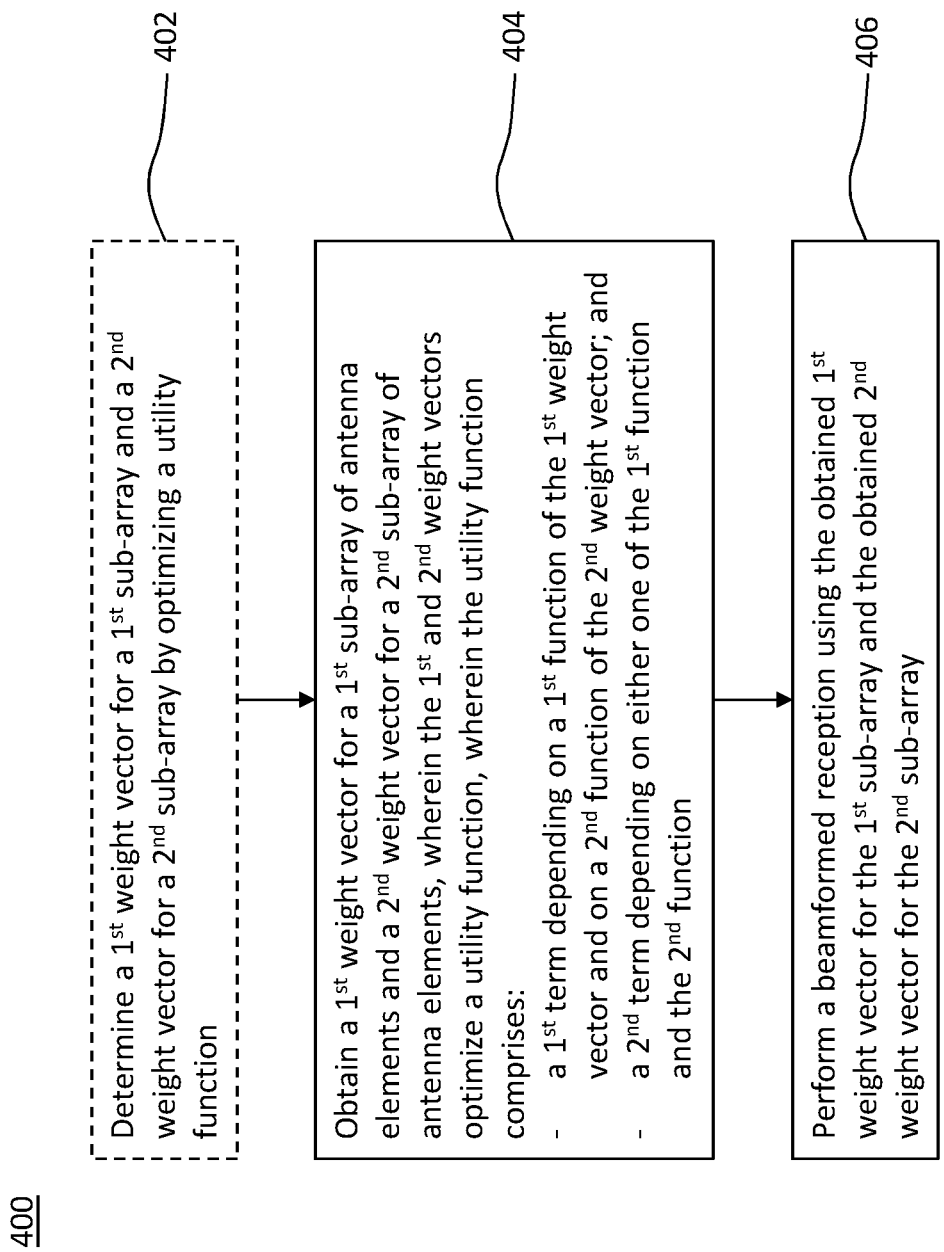
FIG. 4 shows an example flowchart for a method of performing a beamformed reception in a wireless communication using an antenna array comprising two sub-arrays of antenna elements with mutually orthogonal polarizations, which method may be implementable by the device of FIG. 2.

FIG. 4 shows an example flowchart for a method 400 of performing a beamformed reception in a wireless communication using an antenna array comprising a first sub-array of first antenna elements each having a first polarization and a second sub-array of second antenna elements each having a second polarization that is orthogonal to the first polarization. The method 400 comprises or initiates a step 404 of obtaining a first weight vector for the first sub-array and a second weight vector for the second sub-array. The first weight vector and the second weight vector optimize a utility function. The utility function comprises a first term depending on a first function of the first weight vector and on a second function of the second weight vector. The utility function further comprises a second term depending on either one of the first function and the second function. The method 400 further comprises or initiates a step 406 of performing the beamformed reception using the obtained first weight vector for the first sub-array of antenna elements and the second weight vector for the second sub-array of antenna elements.

Optionally, the method 400 further comprises or initiates a step 402 of determining the first weight vector for the first sub-array and the second weight vector for the second sub-array by optimizing the utility function.

The method 400 may be performed by the device 200. For example, the units 202, 204 and 206 may perform the steps 402, 404 and 406, respectively.

The technique may be applied to uplink (UL), downlink (DL) or direct communications between radio devices, e.g., device-to-device (D2D) communications or sidelink communications.

Each of the device 100 and the device 200 may be a radio device and/or a base station (BS).

Herein, any radio device may be a mobile or portable station and/or any radio device wirelessly connectable to a base station or RAN, or to another radio device. A radio device may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP sidelink connection.

Furthermore, any base station may be a station providing radio access, may be part of a radio access network (RAN) and/or may be a node connected to the RAN for controlling radio access. Moreover, a base station may be an access point, for example a Wi-Fi access point.

According to the method 300 for performing a dual-polarized beamformed transmission and the method 400 for performing a dual-polarized beamformed reception, the utility function comprising the second term allows for a special design of the beamforming weights that provides a smoother and/or less changing (transmission or reception) power profile for each polarization individually (i.e., the per-polarization patterns), e.g., as a function of the azimuth. Nulls (e.g., deep nulls) in the per-polarization patterns can be avoided. Channel estimation and link performance, in particular in high-mobility scenarios, can be improved. A high-mobility scenario may for example relate to a network node 100 or 200 located in proximity to a highway serving radio devices 200 or 100, respectively, e.g. vehicles.

Figure 5:
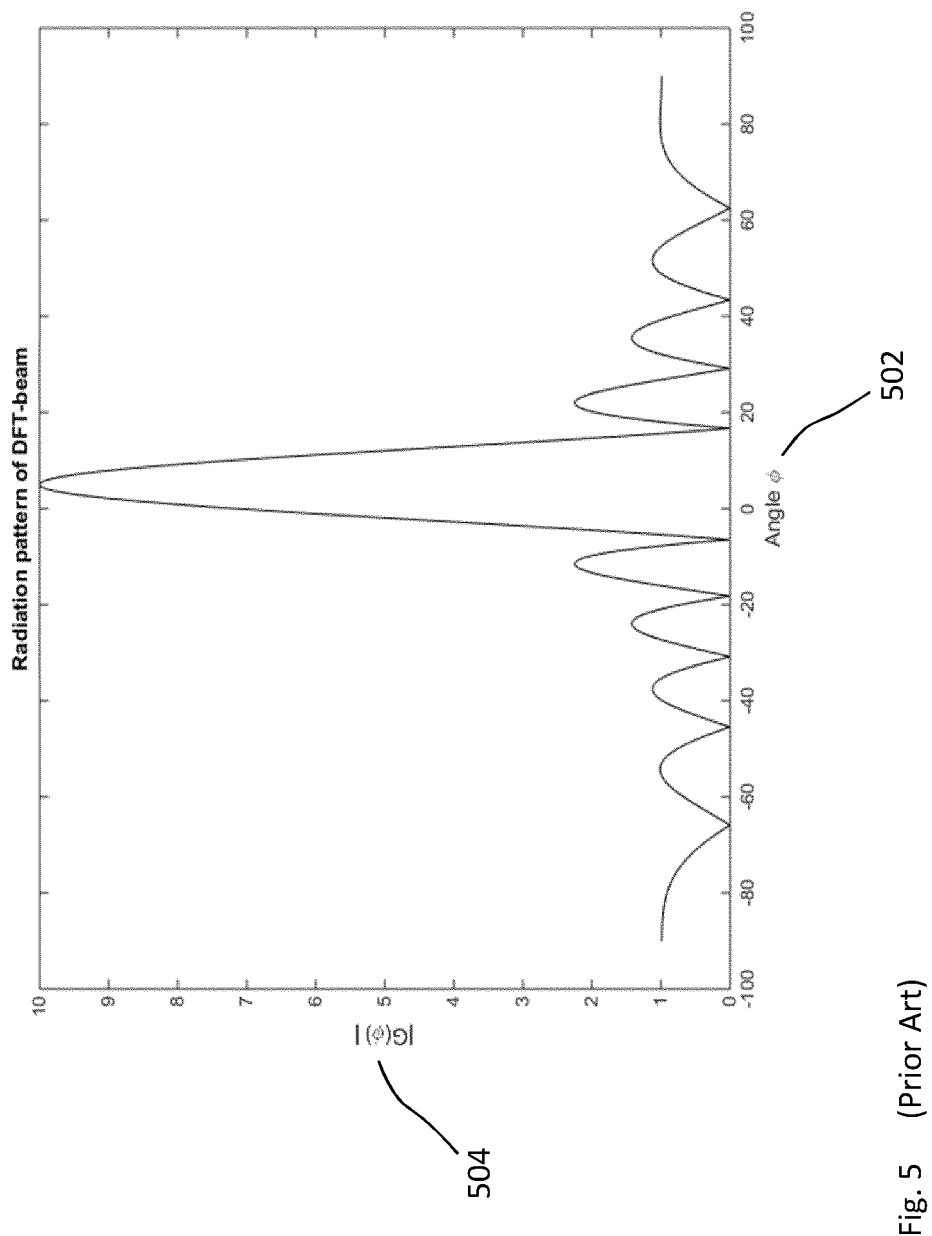
FIG. 5 shows a radiation pattern of a Discrete Fourier Transformed beam.

In any embodiment, the transmit or receive power pattern (also: "radiation pattern") of a discrete Fourier transform (DFT)-beam pointing at an angle $\phi_0$ transmitted from a uniform linear array (ULA) of N antenna elements with (e.g., dimensionless) uniform distance, $d_\lambda$, of neighboring antenna elements in units of the wavelength $\lambda$ may be described by a Dirichlet kernel:

$$|G(\phi)| = \left| \frac{\sin[N\pi d_\lambda(\sin\phi - \sin\phi_0)]}{\sin[\pi d_\lambda(\sin\phi - \sin\phi_0)]} \right|,$$

as depicted for example in FIG. 5 for a DFT-beam with N=10, $\phi_0$=5°, where at reference sign 502 the azimuthal angle $\phi$ is displayed and at reference sign 504, the absolute value of the Dirichlet kernel and/or the radiation pattern of the DFT-beam in dependence of the azimuthal angle $\phi$ is shown.

As the number of antenna elements N in the ULA increases, the radiation pattern becomes more and more narrow and increases the antenna gain at $\phi=\phi_0$. Actually, as N→∞ the Dirichlet kernel approaches a Dirac delta function with infinitely small beamwidth and infinite antenna gain a=$\phi_0$: $|G(\theta)| \to \delta(\phi-\phi_0)$.

At least some transmission 306 or receptions 406 (e.g., broadcast data and/or reference signals) need wide coverage (e.g., a wide beam) in order to reach all radio devices within a cell and/or a coverage area of a network node.

In WO 2017/190811 A1, a wide beam is conventionally constructed from a complementary (e.g., orthogonal) pair of beams per polarization. The beamforming weights of such pairs of beams are obtained based on Golay complementary sequence pairs. However, since Golay complementary sequences are known only for certain sequence lengths and/or sizes of the antenna array, a numerical solution based on so-called epsilon-complementary sequences can alternatively be used. Conventionally, per-polarization beams obtained by such a numerical solution exhibit nulls (also referred to as deep nulls) and/or power dips in certain directions, that are complemented by peaks in that direction of the beam of the other polarization, e.g., as depicted in FIG. 6 for N=5 antenna elements of a ULA.

Figure 6:
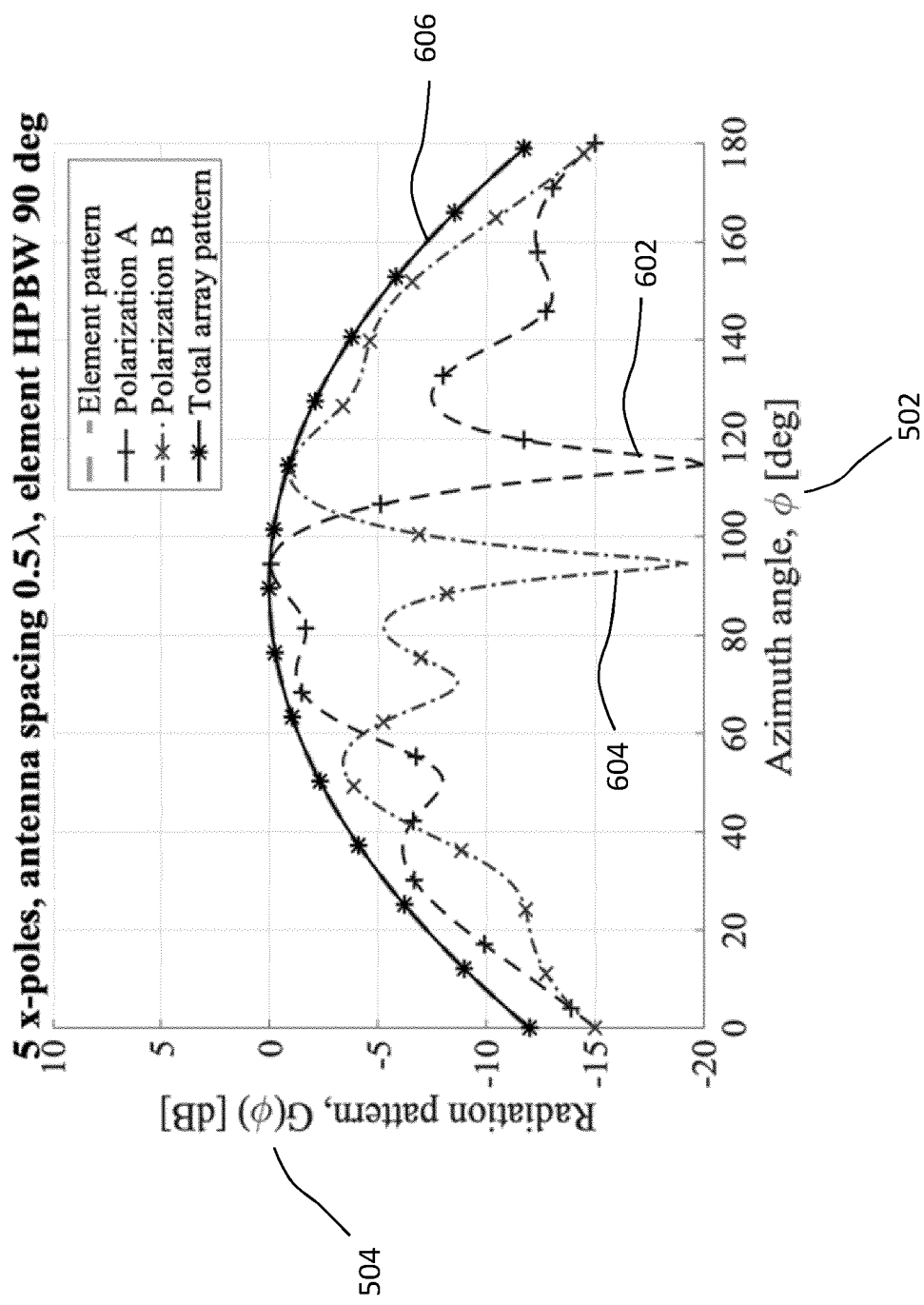
FIG. 6 schematically illustrates conventional radiation patterns of two mutually orthogonal polarized sub-arrays of an antenna array, which comprise deep nulls and sum up to a total radiation pattern corresponding to the radiation pattern of a single antenna element.

In FIG. 6, at reference sign 602, the transmission power pattern of a first polarization (also denoted as "polarization A") is depicted, exhibiting a deep null at approximately 115 degrees (also abbreviated by deg). At reference sign 604, the transmission power pattern of a second polarization (also denoted as "polarization B") is depicted, exhibiting a deep null at approximately 95 deg. The power pattern 602 of polarization A exhibits a local maximum at the deep null of the power pattern 604 of polarization B, and vice versa. The sum of the two per-polarization power patterns 602 and 604, i.e. the total transmit power pattern, is shown to be (e.g., approximately) identical (up to scaling) to the transmit power pattern of a single antenna element at reference sign 606.

The consequences of a dual-polarized beam are discussed in connection with FIG. 7. On the left-hand side (i) of FIG. 7, a power profile of a single wide beam formed using either a single one or both of two antenna elements with different polarizations 602, 604 at a network node 100 is schematically shown. On the right-hand side (ii) of FIG. 7, the power profile 602, 604 obtained with multiple narrow beams with different polarizations and/or dual-polarized beamforming (with N=4 antenna elements per sub-array) is schematically shown. The total transmit power profile (e.g., the sum of the powers in the two polarizations A and B at reference signs 602 and 604, respectively) is identical in the two deployment cases on the left-hand side (i) and on the right-hand side (ii) of FIG. 7. Therefore, for a stationary UE at reference sign 200, the performance is (e.g., at least approximately) identical for the two deployment cases.

Figure 7:
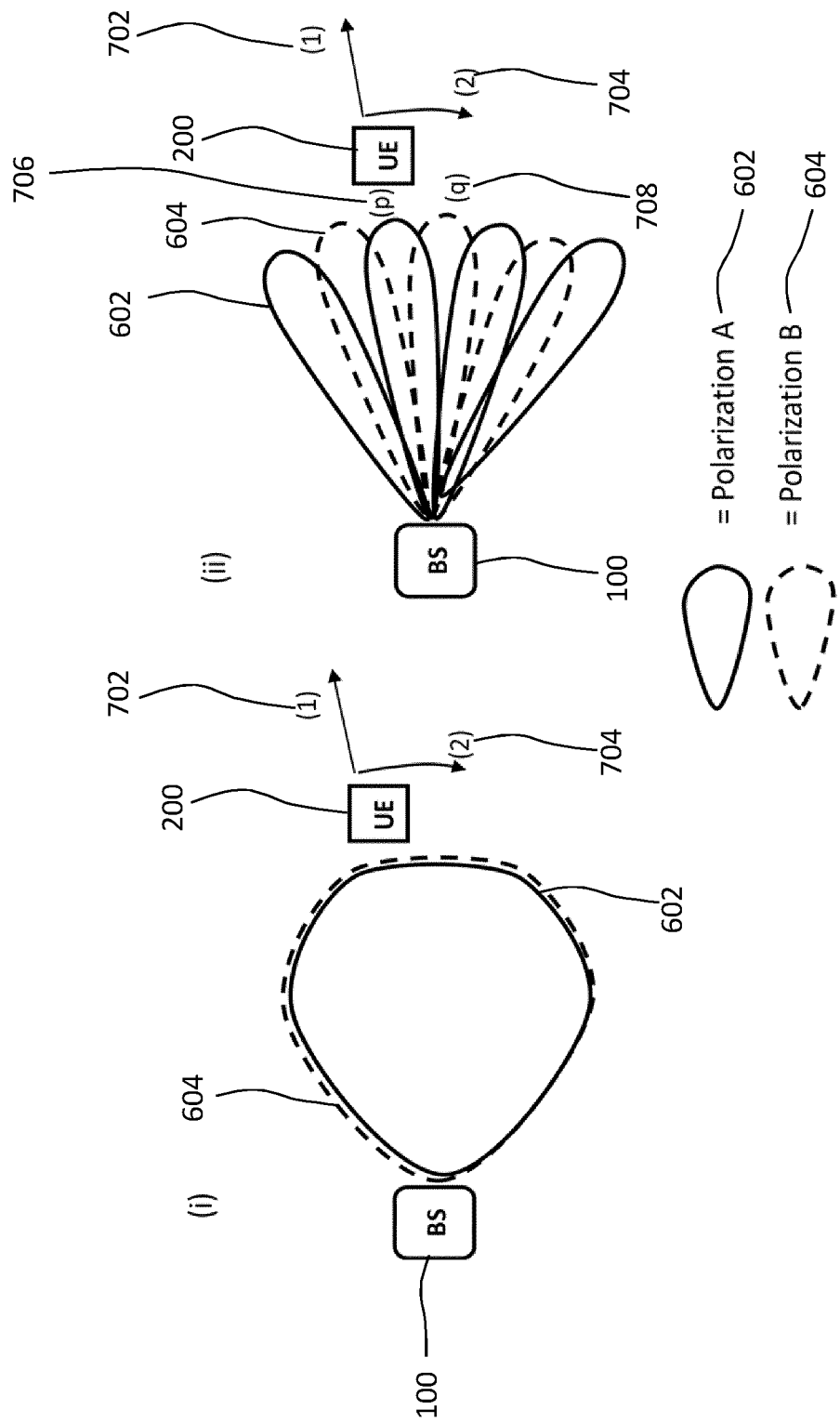
FIG. 7 schematically illustrates radiation patterns of two orthogonal polarizations received by a moving radio device in dependence of its moving direction relative to a transmitting network node for a single antenna element per polarization (left hand side) and for sub-arrays of antenna elements per polarization (right hand side)

Also a UE 200 moving directly (i.e., radially) towards or away from the BS 100 in a direction "(1)", e.g., as indicated by the arrows (1) at reference sign 702 in FIG. 7, experiences (e.g., at least approximately) identical performance in the two deployment cases. In particular, the power that the UE 200 receives on the respective polarizations 602, 604 stays essentially unchanged (e.g., up to fading with increasing distance between the transmitting BS 100 and the receiving UE 200) as the UE 200 moves, at least if assuming line-of-sight (LOS) conditions. This makes channel estimation in the UE 200, which is typically performed per polarization 602, 604, straightforward and predictable, even at high speeds of UE 200 along the propagation direction of the beam 602, 604.

However, for a UE 200 moving in a direction "(2)" perpendicular to the propagation direction of the beam 602, 604, e.g., as depicted by the arrows (2) at reference sign 704 in FIG. 7, the situation differs substantially between the two deployment cases. In the deployment case on the left-hand side (i) of FIG. 7, the received power in the respective polarization (A or B) 602 or 604 again does not change as the UE 200 moves. In contrast, in the conventional deployment case on the right-hand side (ii) of FIG. 7, which results from optimizing a utility function without the second term, the received power in the different polarizations 602, 604 can change substantially even for a rather small change (e.g., along the direction (2) at reference sign 704) in the location of the UE 200. For example, in location (p) at reference sign 706, the UE 200 receives power only (or mainly) with polarization A (at reference sign 602) and not (or only very little) with polarization B (at reference sign 604), while in location (q) at reference sign 708, the UE 200 receives power only (or mainly) with polarization B (at reference sign 604) and not (or only very little) with polarization A (at reference sign 602). This rapid change in the channel (e.g. from position (p) to (q) at reference signs 706 and 708, respectively) makes channel estimation in the UE 200 challenging (e.g. because less averaging in the time domain is possible) and leads to reduced link performance, e.g. to lower bit rates.

It is noted that some small degree of channel variation (e.g., less than 10% in received power) may not prevent a successful or continuous channel estimation, e.g., since the UE 200 can still track the channel, and bit rates will remain high. The most problematic situation in the conventional case (ii) can be close to the deep fading dips, at which power is lost completely or almost completely for one polarization, for example at (e.g., approximately) 115 deg for polarization A at reference sign 602 in FIG. 6 and at (e.g., approximately) 95 deg for polarization B at reference sign 604 in FIG. 6). At the deep fading dips, the change in the channel can hence be substantial (e.g., more than 50% in received power) even for very small UE movements (e.g., by one or few degrees in the azimuth).

Furthermore, the disadvantages with the deployment case (ii) on the right-hand side over the deployment case on the left-hand side (i) of FIG. 7 are not necessarily limited to channel estimation issues at the receiver 200, e.g. a UE 200. If the transmitter 100, e.g. a BS 100, adapts precoder weights for the two polarization directions 602, 604 independently (i.e. in total two independent weights), which is conventionally the case, the optimal precoding weights do not change as the UE 200 moves in the deployment case of the left-hand side (i) of FIG. 7, but change rapidly when the UE 200 moves in direction (2) in the deployment case on the right-hand side (ii) of FIG. 7. Consequently, in the deployment case (ii) on the right-hand side of FIG. 7, there is a need for fast and accurate adaptations of precoder weights, which in turn requires frequent feedback about the channel state measured by the UE 200. This leads to increased system overhead and reduced robustness, and hence to reduced link performance.

Although the focus in the (e.g., above) description is on DL transmissions from BS 100 to UE 200, fully analogous conclusions hold for UL transmission from UE 100 to BS 200 and/or for sidelink transmissions between two UEs, one of which acts as transmitter 100 and the other as receiver 200.

Embodiments use special beamforming weights, which provide a smoother and/or less varying power profile for each individual polarization than in the conventional dual-polarized beamforming scenario and, as a consequence, improved channel estimation in high-mobility scenarios will be described. For example, deep nulls in the per-polarization patterns can be avoided.

By using (e.g., according to the steps 306 and/or 406) the weights obtained according to the steps 304 and/or 404, i.e. special beamforming weights optimizing the utility function including the second term, a lower variation in per-polarization received power can be obtained, which can yield better channel estimation and link performance in high-mobility scenarios than the conventional choice of dual-polarized beamforming weights.

In an embodiment, once the unlikely high-mobility scenario is detected (e.g., deployment case on the right-hand side (ii) of FIG. 7 with a UE 200 moving in direction (2) at reference sign 704), a BS 100 can perform one of the three actions. Firstly, the BS 100 can disable broad beamforming in this embodiment. Secondly, the BS 100 can broadcast via a single antenna element (which has a disadvantage of poor PA utilization). Thirdly, special beamforming weights can be pre-designed (e.g. according to the utility function described herein) to exhibit limited variation in per-polarization radiation patterns.

Alternatively or in addition, the weights (also referred to as special beamforming weights or beamforming weights) may be (e.g., selectively) obtained 304 or 404, and/or (e.g., selectively) determined 302 or 404, and/or (e.g., selectively) applied 306 or 406 in dependence of a deployment of the transmitter 100, e.g. a BS 100, and/or receiver 200, e.g., a BS 200. For example, the weights may be (e.g., selectively) obtained 304 or 404, and/or (e.g., selectively) determined 302 or 404, and/or (e.g., selectively) applied 306 or 406 in case of a high mobility, e.g., if the BS 100 or 200 is located in proximity to a highway and/or depending on an average velocity of vehicles 200 or 100 on the highway.

The knowledge of the (e.g., total or per-polarization) power pattern (e.g., the dual-polarized broad beam shape) resulting from the utility function comprising the second term and/or any implementation of the optimization of the utility function may be used in channel estimation and/or in precoding. This can facilitate channel estimation and/or precoding, e.g., in combination with a (e.g., rough) angular position and/or angular motion of the radio device (e.g., UE). The power pattern may be rather complicated.

Herein, "angular" may refer to the azimuth. The (e.g., total or per-polarization) power pattern may also be referred to as a (e.g., total or per-polarization) radiation pattern or a (e.g., total or per-polarization) angular pattern.

The weights (also referred to as special beamforming weights or beamforming weights) may be based on an algorithm for optimizing a pair of polyphase complex-valued beamforming weights (e.g., one polyphaser complex-valued beamforming weight vector per polarization) that provide a broad total radiation pattern, while maintaining a low variation in per-polarization radiation patterns.

According to an embodiment, which is combinable with any other embodiment disclosed herein, the determining 302, 402 or the obtaining 304, 404 of the beamforming weights according to the methods 300 and 400 differs from the conventional dual-polarized beams of the document WO 2017/190811 A1 due to the second term in the utility function.

Optimizing the utility function comprising the second term is also referred to as a modified optimization. A corresponding algorithm for the modified optimization may also be referred to as a modified algorithm. The weights of the first and second weight vectors according to the methods 300 and 400 may also be referred to as wide-beam weights.

A modified Great Deluge (GD) algorithm (GDA, see Algorithm 1 below) may be used to optimize the broad-beam weights for any size N of the ULA. The vectors $\varphi_A = \arg(w_A)$ and $\varphi_B = \arg(w_B)$ denote the vectors of phases of the (e.g., unit-modulus) beamforming weights for the two polarizations. The two phase vectors are stacked on top of each other as $\varphi = [\varphi_A, \varphi_B]^T \in \mathbb{C}^{2N}$, wherein $\varphi_n \in [0, 2\pi)$, n=1, ..., 2N. A vector of phase increments $\Delta\varphi$ is defined, wherein $\Delta\varphi_n \in [0, \pi)$, n=1, ..., 2N.

The utility function for the conventional GD algorithm is modified in order to take into account the requirement on individual per-polarization patterns, e.g., to avoid deep nulls and/or to mitigate power dips at predefined azimuthal angles. This is done by penalizing the large side-lobes of the per-sequence aperiodic autocorrelation functions (AACF) comprised in the utility function.

An AACF $R_u(\tau)$ for a sequence $u = (u_1, u_2, \ldots, u_n)$ of length N depending on an integer $\tau$ can for example be defined as:

$$R_u(\tau) = \begin{cases} \sum_{n=1}^{N-\tau} u_n u_{n+\tau}^*, & 0 \leq \tau \leq N-1 \\ \sum_{n=1}^{N+\tau} u_{n-\tau} u_n^*, & -N+1 \leq \tau < 0 \\ 0, & \tau \leq -N \text{ or } \tau \geq N \end{cases}$$

According to an embodiment, which is combinable with any other embodiment disclosed herein, the utility function is formed as $$U(\varphi) = (1-q)U_j(\varphi) + qU_i^\beta(\varphi). \tag{1}$$

The first term in equation (1) comprises the joint metric for the two sequences (e.g., the two weight vectors $w_A$ and $w_B$ of the two polarizations) in the pair given by the p-norm of the sum the AACFs per sequence, excluding the zero-th lag:

$$U_j(\varphi) = -\sqrt[p]{\sum_{\tau=1}^{M-1} |R_{w_A}(\tau) + R_{w_B}(\tau)|^p}. \tag{2}$$

The individual metric for either one of the sequences is, e.g., comprised in the second term in equation (1) computed as $$U_i(\varphi) = -\max\left\{ \sqrt[p]{\sum_{\tau=1}^{M-1} |R_{w_A}(\tau)|^p}, \sqrt[p]{\sum_{\tau=1}^{M-1} |R_{w_B}(\tau)|^p} \right\}. \tag{3}$$

The second term of the utility function in equation (3) depends on the maximum of the p-norms of the individual AACFs of each of the sequences (e.g., the two weight vectors $w_A$ and $w_B$ of the two polarizations).

The parameters q and $\beta$ in the utility function of equation (1) allow to set the priority between the two metrics, e.g. the conventional joint metric of equation (1) and the individual metric of equation (2).

The mixing parameter q (e.g., for mixing the first term and the second term) may be in the range of $0 \leq q < 1$ (preferably, $0 < q < 1$). For example, q=0.5.

Alternatively or in addition, the exponent $\beta$ of the second term may be positive, i.e., in the range $\beta > 0$. The exponent $\beta$ may be equal to 1, or less than 1, or greater than 1. For example, $\beta=2$.

Alternatively or in addition, the metric parameter p of the metric may be equal to 2 or may be greater than 2. The parameter p of the metric may be a positive integer. For example, p=6.

According to an embodiment, which is combinable with any embodiment disclosed herein, the weights (also referred to as beamforming weights) of the two polarizations are determined by maximizing the utility function of equation (1), or equivalently by minimizing the absolute value of the utility function of equation (1), using the iterative GD algorithm (also: "Algorithm 1") described below, in which the phases $\varphi_n$ of the weights $w_A$ and $w_B$ are changed and/or varied (e.g., incremented and/or decremented) step-wise by an amount $\Delta\varphi_n$. The step size may be changed (e.g. decreased) by a scaling factor $\alpha$ with $0 < \alpha \leq 1$.

Algorithm 1. Iterative GDA algorithm for computing the beamforming weights

Initialize randomly weight phases $\varphi_n \in [0,2\pi)$ and phase increments $\Delta\varphi_n \in [0, \pi)$
for n = 1, ... , 2N.
Set rain intensity V > 0, phase scaling factor $\alpha \in (0,1)$ and tolerance threshold
$\zeta > 0$.
Initialize the counter of unsuccessful alternations: u ← 0.
Compute the starting water level: $\lambda \leftarrow U(\varphi)$.
While $|U(\varphi)| > \epsilon$ do
  Initialize the number of dry runs: d ← 0.
  For n = 1 → 2N do
    Increment phase: $\varphi_n \leftarrow \varphi_n + \Delta\varphi_n$.
    If $U(\varphi) > \lambda$ then
      Increase the water level: $\lambda \leftarrow \lambda + V$.
      Increment the number of dry runs: d ← d + 1.
    Else
      Reverse step: $\Delta\varphi_n \leftarrow -\Delta\varphi_n$.
      Back off: $\varphi_n \leftarrow \varphi_n + \Delta\varphi_n$.
  If d = 0 then
    Increment the number of unsuccessful alternations: u ← u + 1.
    If U ≥ 2 then
      Scale down the step size: $\Delta\varphi_n \leftarrow \alpha\Delta\varphi_n$.
  Else
    Reset the number of dry runs: d ← 0.

Figure 8:
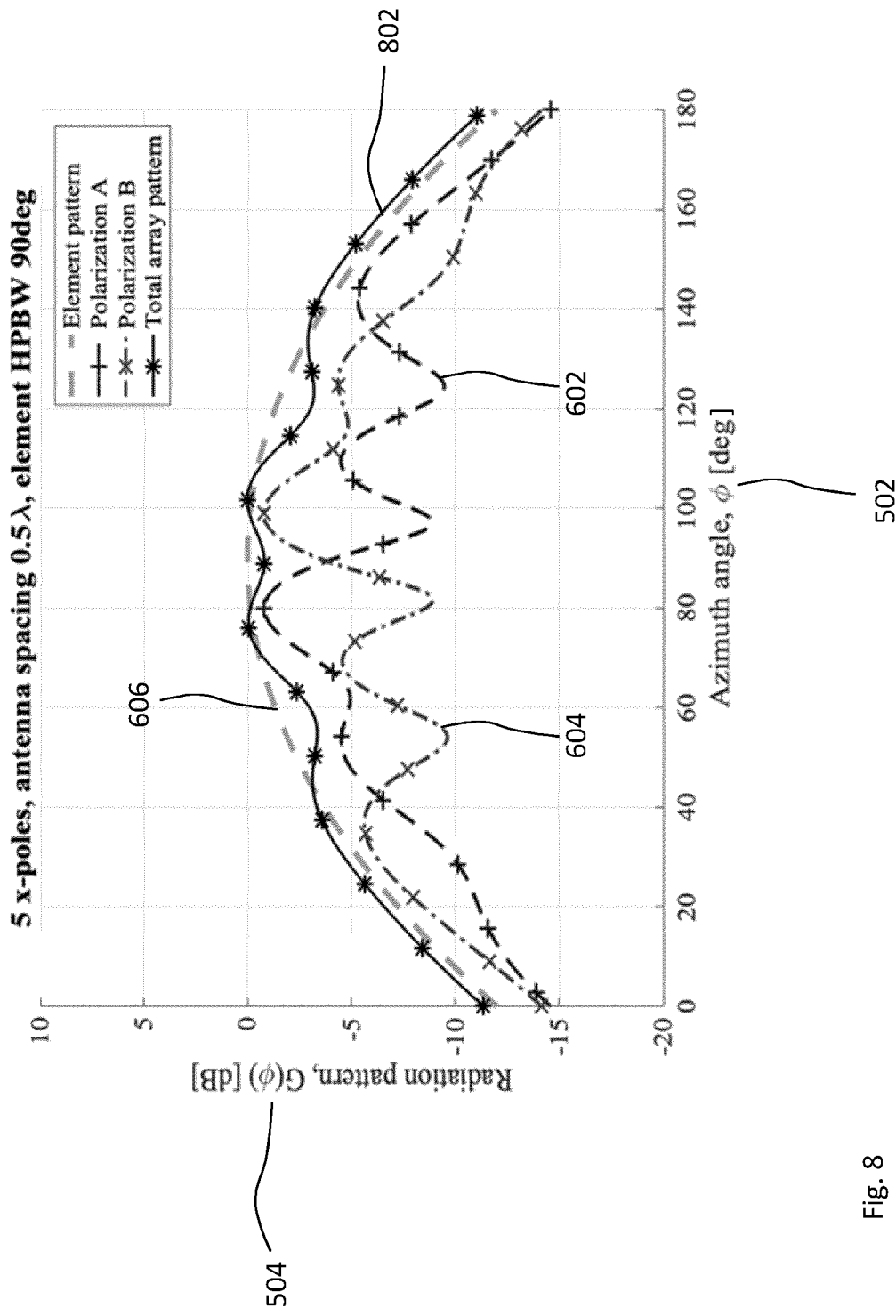
FIG. 8 schematically illustrates radiation patterns of two sub-arrays with mutually orthogonal polarizations with mitigated power dips according to an embodiment of the technique along with the total radiation pattern of the antenna array, which approximates the radiation pattern of a single antenna element.

An illustrative example of dual-polarized beamforming weights determined based on optimizing the utility function of equation (1) using the GD algorithm is displayed in FIG. 8, wherein the mixing parameter between the first term and the second term of the utility function is set to q=0.5, the exponent of the second term is set to β=2, the norm is taken for p=6, and each sub-array comprises a horizontal ULA with N=5 antenna elements.

In FIG. 8, the variation of the per-polarization radiation pattern 602 and 604 (for polarization A and B, respectively) is reduced compared to the conventional per-polarization radiation patterns 602, 604 in FIG. 6. The reduction in the variations and/or the mitigation of power lows per polarization in FIG. 8 comes at the cost of slight ripples of the total radiation pattern 802, leading to deviations from the (rescaled) radiation pattern 606 of a single antenna element. Importantly, there are no longer nulls in the per-polarization patterns 602 and 604, which significantly simplifies channel estimation and improves stable reception for a moving UE, e.g. UE 200 moving along the direction at reference sign 704 in FIG. 7.

Although the above algorithm for determining beamforming weights has been described in connection with the GD algorithm for a ULA, the expressions can be easily generalized to two-dimensional sub-arrays of a two-dimensional antenna array, e.g. using the AACF for an array U of size N×M, which for two integers $\tau_n$, $\tau_m$ counting the number of antenna elements per dimension reads:

$$R_U(\tau_n, \tau_m) = \sum_{n=1}^{N-\tau_n} \sum_{m=1}^{M-\tau_m} [U]_{n,m}[U]^*_{n+\tau_n,m+\tau_m} \quad 0 \leq \tau_n \leq N-1,$$

$$0 \leq \tau_m \leq M-1$$

The complete expression for the two-dimensional AACF for other (e.g., negative) values of $\tau_n$, $\tau_m$ can be found, e.g., in WO 2017/190811 A1.

Alternatively or in addition, the utility function comprising two terms, e.g. the utility function of equation (1) with terms in equations (2) and (3), may be optimized using other algorithms, e.g. modifications of the CANARY algorithm, MM algorithm and/or SA algorithm described in WO 2017/190811 A1.

Figure 9:
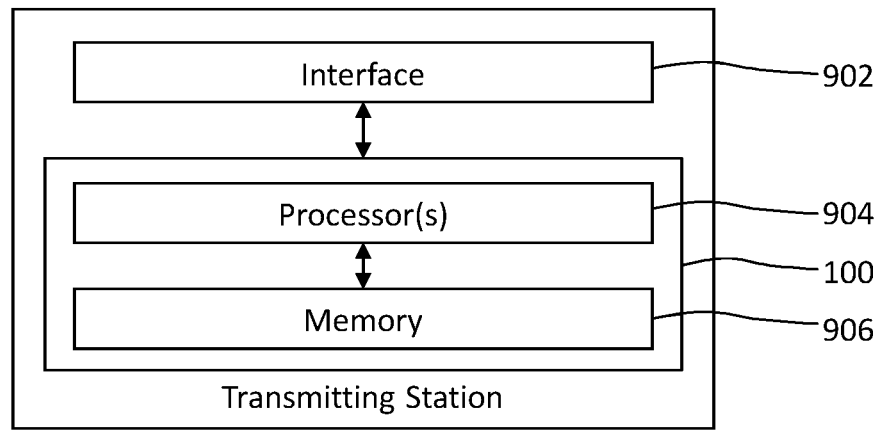
FIG. 9 shows an example schematic block diagram of a transmitting station embodying the device of FIG. 1.

FIG. 9 shows a schematic block diagram for an embodiment of the device 100. The device 100 comprises one or more processors 904 for performing the method 300 and memory 906 coupled to the processors 904. For example, the memory 906 may be encoded with instructions that implement at least one of the modules 102, 104 and 106.

The one or more processors 904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 906, transmitter functionality. For example, the one or more processors 904 may execute instructions stored in the memory 906. Such functionality may include providing various features and steps discussed herein, including any of the benefits disclosed herein. The expression "the device being operative to perform an action" may denote the device 100 being configured to perform the action.

As schematically illustrated in FIG. 9, the device 100 may be embodied by a transmitting station 900, e.g., functioning as a transmitting base station or a transmitting UE. The transmitting station 900 comprises a radio interface 902 coupled to the device 100 for radio communication with one or more receiving stations, e.g., functioning as a receiving base station or a receiving UE.

Figure 10:
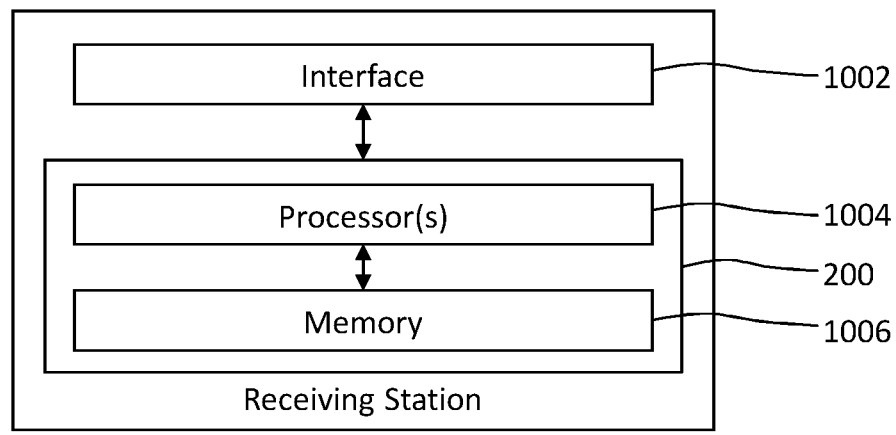
FIG. 10 shows an example schematic block diagram of a receiving station embodying the device of FIG. 2.

FIG. 10 shows a schematic block diagram for an embodiment of the device 200. The device 200 comprises one or more processors 1004 for performing the method 400 and memory 1006 coupled to the processors 1004. For example, the memory 1006 may be encoded with instructions that implement at least one of the modules 202, 204 and 206.

The one or more processors 1004 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 1006, receiver functionality. For example, the one or more processors 1004 may execute instructions stored in the memory 1006. Such functionality may include providing various features and steps discussed herein, including any of the benefits disclosed herein. The expression "the device being operative to perform an action" may denote the device 200 being configured to perform the action.

As schematically illustrated in FIG. 10, the device 200 may be embodied by a receiving station 1000, e.g., functioning as a receiving base station or UE. The receiving station 1000 comprises a radio interface 1002 coupled to the device 200 for radio communication with one or more transmitting stations, e.g., functioning as a transmitting base station or UE.

Figure 11:
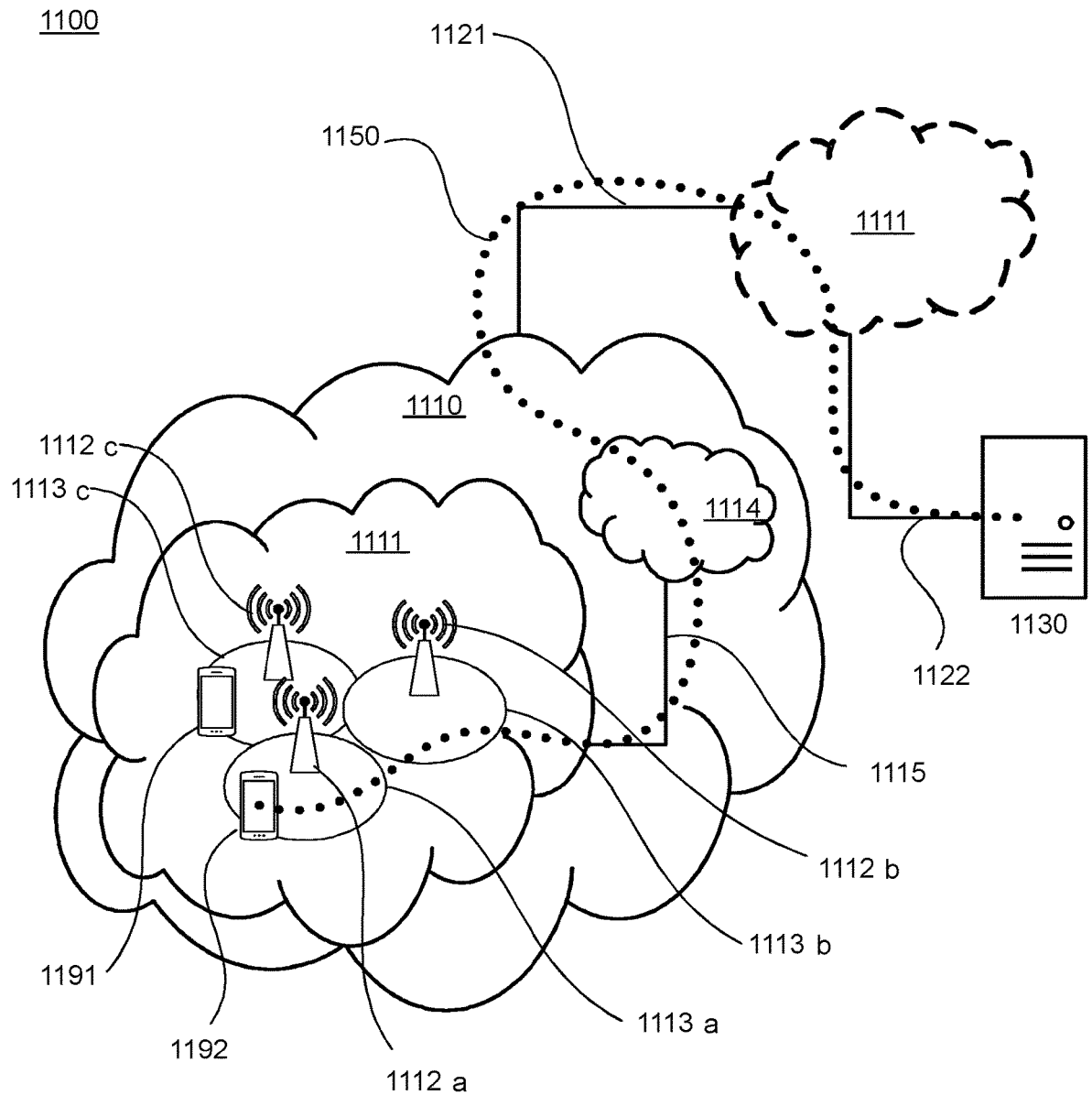
FIG. 11 schematically illustrates an example telecommunication network connected via an intermediate network to a host computer.

With reference to FIG. 11, in accordance with an embodiment, a communication system 1100 includes a telecommunication network 1110, such as a 3GPP-type cellular network, which comprises an access network 1111, such as a radio access network, and a core network 1114. The access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to the core network 1114 over a wired or wireless connection 1115. A first user equipment (UE) 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

The telecommunication network 1110 is itself connected to a host computer 1130, which may be embodied in the hardware and/or software of a standalone server, a cloud-implemented server, a distributed server or as processing resources in a server farm. The host computer 1130 may be under the ownership or control of a service provider, or may be operated by the service provider or on behalf of the service provider. The connections 1121, 1122 between the telecommunication network 1110 and the host computer 1130 may extend directly from the core network 1114 to the host computer 1130 or may go via an optional intermediate network 1120. The intermediate network 1120 may be one of, or a combination of more than one of, a public, private or hosted network; the intermediate network 1120, if any, may be a backbone network or the Internet; in particular, the intermediate network 1120 may comprise two or more sub-networks (not shown).

The communication system 1100 of FIG. 11 as a whole enables connectivity between one of the connected UEs 1191, 1192 and the host computer 1130. The connectivity may be described as an over-the-top (OTT) connection 1150. The host computer 1130 and the connected UEs 1191, 1192 are configured to communicate data and/or signaling via the OTT connection 1150, using the access network 1111, the core network 1114, any intermediate network 1120 and possible further infrastructure (not shown) as intermediaries. The OTT connection 1150 may be transparent in the sense that the participating communication devices through which the OTT connection 1150 passes are unaware of routing of uplink and downlink communications. For example, a base station 1112 may not or need not be informed about the past routing of an incoming downlink communication with data originating from a host computer 1130 to be forwarded (e.g., handed over) to a connected UE 1191. Similarly, the base station 1112 need not be aware of the future routing of an outgoing uplink communication originating from the UE 1191 towards the host computer 1130.

By virtue of the method 300 and 400 being performed by any one of the UEs 1191 or 1192 and/or any one of the base stations 1112, the performance of the OTT connection 1150 can be improved, e.g., in terms of increased throughput and/or reduced latency.

Example implementations, in accordance with an embodiment, of the UE, base station and host computer discussed in the preceding paragraphs will now be described with reference to FIG. 12. In a communication system 1200, a host computer 1210 comprises hardware 1215 including a communication interface 1216 configured to set up and maintain a wired or wireless connection with an interface of a different communication device of the communication system 1200. The host computer 1210 further comprises processing circuitry 1218, which may have storage and/or processing capabilities. In particular, the processing circuitry 1218 may comprise one or more programmable processors, application-specific integrated circuits, field programmable gate arrays or combinations of these (not shown) adapted to execute instructions. The host computer 1210 further comprises software 1211, which is stored in or accessible by the host computer 1210 and executable by the processing circuitry 1218. The software 1211 includes a host application 1212. The host application 1212 may be operable to provide a service to a remote user, such as a UE 1230 connecting via an OTT connection 1250 terminating at the UE 1230 and the host computer 1210. In providing the service to the remote user, the host application 1212 may provide user data, which is transmitted using the OTT connection 1250. The user data may depend on the location of the UE 1230. The user data may comprise auxiliary information or precision advertisements (also: ads) delivered to the UE 1230. The location may be reported by the UE 1230 to the host computer, e.g., using the OTT connection 1250, and/or by the base station 1220, e.g., using a connection 1260.

The communication system 1200 further includes a base station 1220 provided in a telecommunication system and comprising hardware 1225 enabling it to communicate with the host computer 1210 and with the UE 1230. The hardware 1225 may include a communication interface 1226 for setting up and maintaining a wired or wireless connection with an interface of a different communication device of the communication system 1200, as well as a radio interface 1227 for setting up and maintaining at least a wireless connection 1270 with a UE 1230 located in a coverage area (not shown in FIG. 21) served by the base station 1220. The communication interface 1226 may be configured to facilitate a connection 1260 to the host computer 1210. The connection 1260 may be direct or it may pass through a core network (not shown in FIG. 21) of the telecommunication system and/or through one or more intermediate networks outside the telecommunication system. In the embodiment shown, the hardware 1225 of the base station 1220 further includes processing circuitry 1228, which may comprise one or more programmable processors, application-specific integrated circuits, field programmable gate arrays or combinations of these (not shown) adapted to execute instructions. The base station 1220 further has software 1221 stored internally or accessible via an external connection.

The communication system 1200 further includes the UE 1230 already referred to. Its hardware 1235 may include a radio interface 1237 configured to set up and maintain a wireless connection 1270 with a base station serving a coverage area in which the UE 1230 is currently located. The hardware 1235 of the UE 1230 further includes processing circuitry 1238, which may comprise one or more programmable processors, application-specific integrated circuits, field programmable gate arrays or combinations of these (not shown) adapted to execute instructions. The UE 1230 further comprises software 1231, which is stored in or accessible by the UE 1230 and executable by the processing circuitry 1238. The software 1231 includes a client application 1232. The client application 1232 may be operable to provide a service to a human or non-human user via the UE 1230, with the support of the host computer 1210. In the host computer 1210, an executing host application 1212 may communicate with the executing client application 1232 via the OTT connection 1250 terminating at the UE 1230 and the host computer 1210. In providing the service to the user, the client application 1232 may receive request data from the host application 1212 and provide user data in response to the request data. The OTT connection 1250 may transfer both the request data and the user data. The client application 1232 may interact with the user to generate the user data that it provides.

Figure 12:
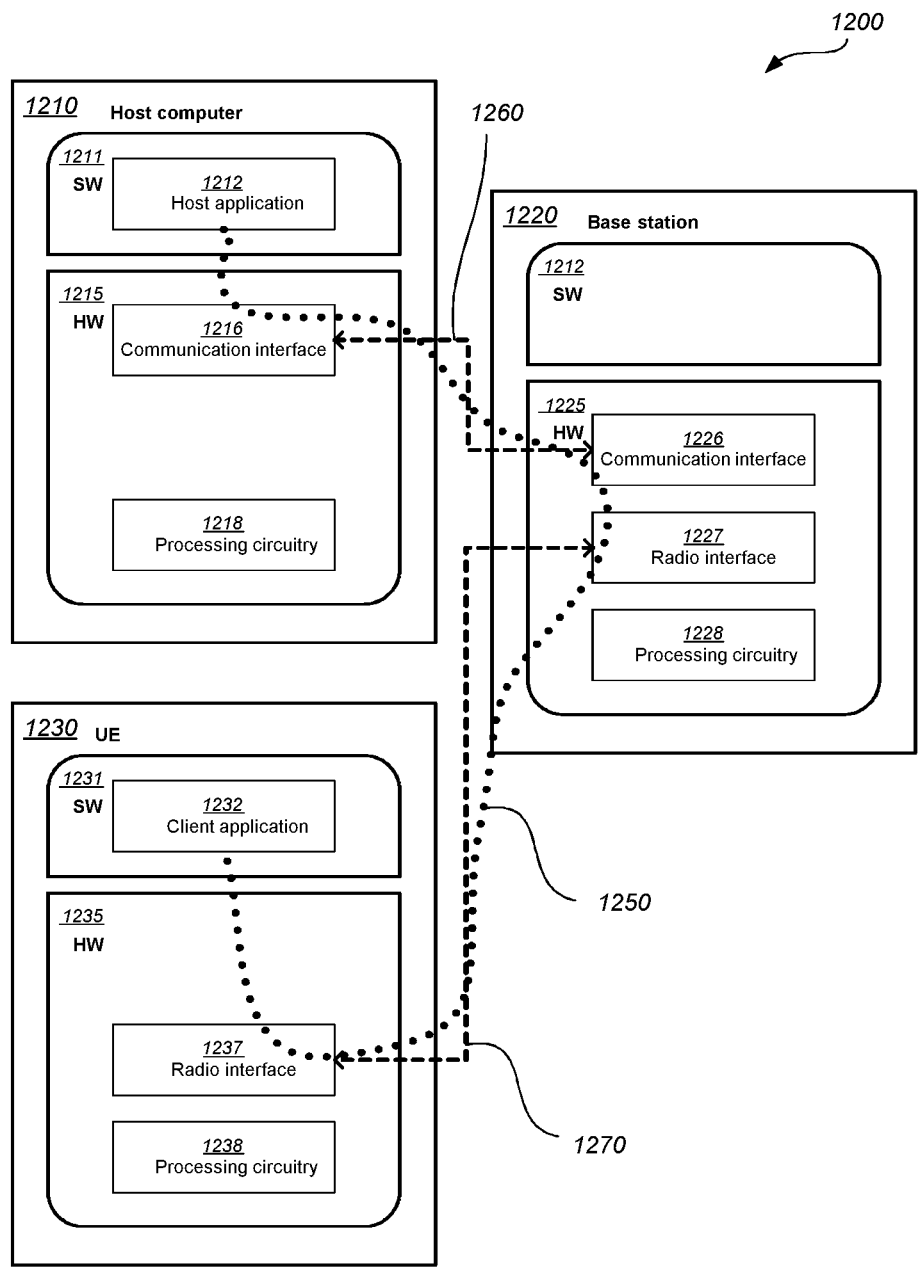
FIG. 12 shows a generalized block diagram of a host computer communicating via a base station or radio device functioning as a gateway with a user equipment over a partially wireless connection.

It is noted that the host computer 1210, base station 1220 and UE 1230 illustrated in FIG. 12 may be identical to the host computer 1130, one of the base stations 1112*a*, 1112*b*, 1112*c* and one of the UEs 1191, 1192 of FIG. 11, respectively. This is to say, the inner workings of these entities may be as shown in FIG. 12 and independently, the surrounding network topology may be that of FIG. 11.

In FIG. 12, the OTT connection 1250 has been drawn abstractly to illustrate the communication between the host computer 1210 and the use equipment 1230 via the base station 1220, without explicit reference to any intermediary devices and the precise routing of messages via these devices. Network infrastructure may determine the routing, which it may be configured to hide from the UE 1230 or from the service provider operating the host computer 1210, or both. While the OTT connection 1250 is active, the network infrastructure may further take decisions by which it dynamically changes the routing (e.g., on the basis of load balancing consideration or reconfiguration of the network).

The wireless connection 1270 between the UE 1230 and the base station 1220 is in accordance with the teachings of the embodiments described throughout this disclosure. One or more of the various embodiments improve the performance of OTT services provided to the UE 1230 using the OTT connection 1250, in which the wireless connection 1270 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 1250 between the host computer 1210 and UE 1230, in response to variations in the measurement results. The measurement procedure and/or the network functionality for reconfiguring the OTT connection 1250 may be implemented in the software 1211 of the host computer 1210 or in the software 1231 of the UE 1230, or both. In embodiments, sensors (not shown) may be deployed in or in association with communication devices through which the OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of the OTT connection 1250 may include message format, retransmission settings, preferred routing etc.; the reconfiguring need not affect the base station 1220, and it may be unknown or imperceptible to the base station 1220. Such procedures and functionalities may be known and practiced in the art. In certain embodiments, measurements may involve proprietary UE signaling facilitating the host computer's 1210 measurements of throughput, propagation times, latency and the like. The measurements may be implemented in that the software 1211, 1231 causes messages to be transmitted, in particular empty or "dummy" messages, using the OTT connection 1250 while it monitors propagation times, errors etc.

Figures 13, 14:
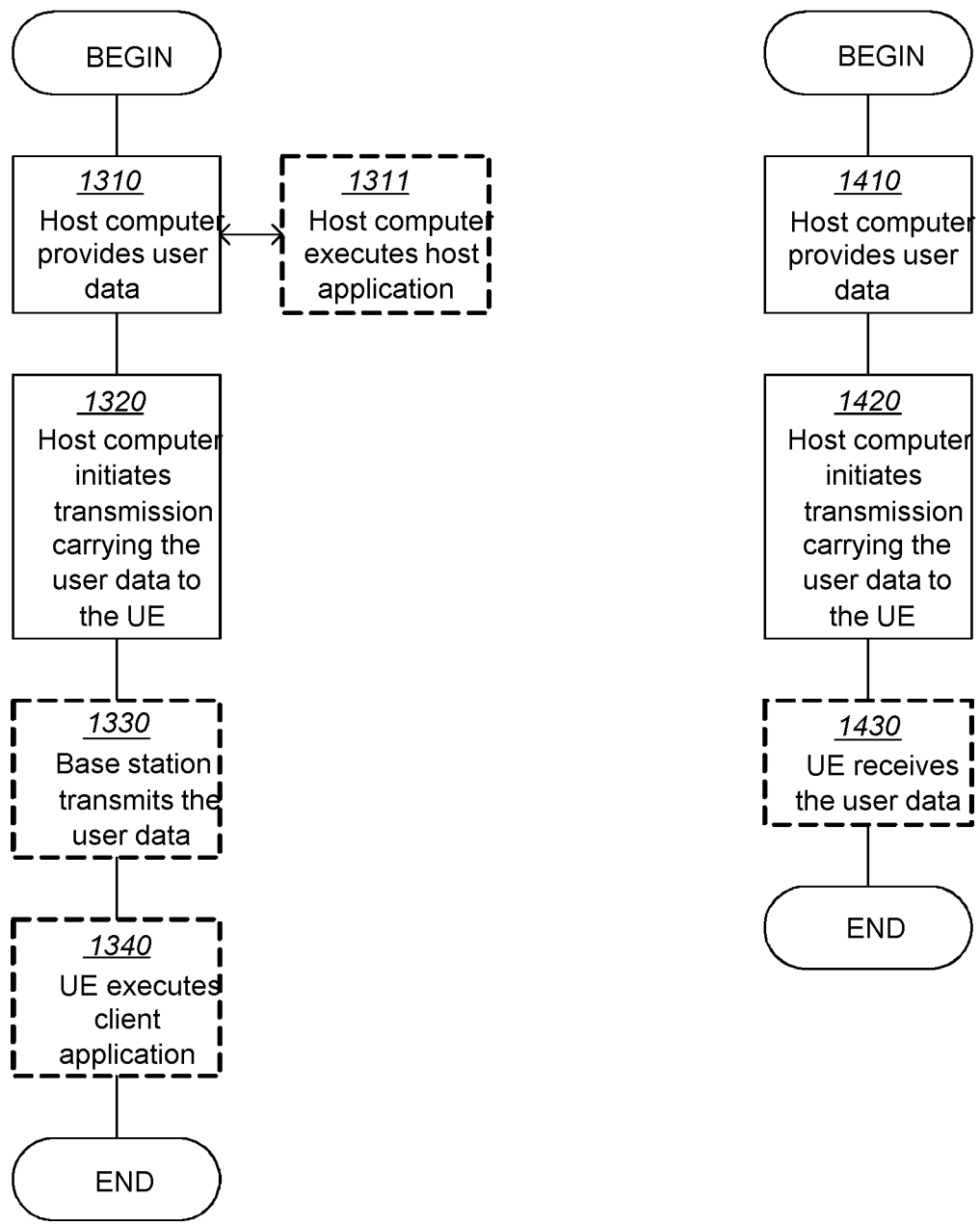
FIGS. 13 and 14 show flowcharts for methods implemented in a communication system including a host computer, a base station or radio device functioning as a gateway and a user equipment.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In a first step 1310 of the method, the host computer provides user data. In an optional substep 1311 of the first step 1310, the host computer provides the user data by executing a host application. In a second step 1320, the host computer initiates a transmission carrying the user data to the UE. In an optional third step 1330, the base station transmits to the UE the user data which was carried in the transmission that the host computer initiated, in accordance with the teachings of the embodiments described throughout this disclosure. In an optional fourth step 1340, the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In a first step 1410 of the method, the host computer provides user data. In an optional substep (not shown) the host computer provides the user data by executing a host application. In a second step 1420, the host computer initiates a transmission carrying the user data to the UE. The transmission may pass via the base station, in accordance with the teachings of the embodiments described throughout this disclosure. In an optional third step 1430, the UE receives the user data carried in the transmission.

As has become apparent from above description, embodiments of the technique allow for beamformed transmissions from and/or beamformed receptions at an antenna array for a (selectively) broad radiation and/or power pattern. The broad-beamforming can be based on exploiting a pair of orthogonal polarizations (e.g., of two sub-arrays) by applying a pair of complementary sequences (e.g., epsilon-complementary sequences). The broad-beamforming technique exhibits low variation in per-polarization beam patterns similar (e.g., up to scaling) in shape to the beam patterns of a single antenna element.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of performing a beamformed transmission and/or a beam formed reception in a wireless communication using an antenna array comprising a first sub-array of first antenna elements each having a first polarization and a second sub-array of second antenna elements each having a second polarization that is orthogonal to the first polarization, the method comprising:
obtaining a first weight vector for the first sub-array of first antenna elements and a second weight vector for the second sub-array of second antenna elements, wherein the first weight vector and the second weight vector optimize a utility function, wherein the utility function comprises a first term depending on a first function of the first weight vector and on a second function of the second weight vector, and wherein the utility function further comprises a second term depending on either one of the first function and the second function; and
performing the beamformed transmission and/or the beamformed reception using the obtained first weight vector for the first sub-array of first antenna elements and the obtained second weight vector for the second sub-array of second antenna elements.

2. The method of claim 1, wherein an angular power pattern of each antenna element within at least one of the first sub-array and the second sub-array is equal.

3. The method of claim 1, wherein optimizing only the first term produces an angular power pattern of the antenna array equivalent to the angular power pattern of a single antenna element within the antenna array.

4. The method of claim 1, wherein optimizing the utility function produces a first angular power pattern of the first sub-array and a second angular power pattern of the second sub-array, and wherein optimizing only the first term produces a third angular power pattern of the first sub-array and a fourth angular power pattern of the second sub-array, wherein an angular variance of each of the first angular power pattern and the second angular power pattern is less than an angular variance of each of the third angular power pattern and the fourth angular power pattern.

5. The method of claim 1, wherein optimizing the utility function produces a first angular power pattern of the first sub-array and a second angular power pattern of the second sub-array, and wherein optimizing only the first term produces a third angular power pattern of the first sub-array and a fourth angular power pattern of the second sub-array, wherein a number of minima of each of the first angular power pattern and the second angular power pattern below a predefined fraction of an angular power pattern of a single antenna element is less than a number of minima of each of the third angular power pattern and the fourth angular power pattern below the predefined fraction of the angular power pattern.

6. The method of claim 1, wherein optimizing the utility function produces a first angular power pattern of the first sub-array and a second angular power pattern of the second sub-array, and wherein optimizing only the first term produces a third angular power pattern of the first sub-array and a fourth angular power pattern of the second sub-array, wherein the sum of an angular range of each of the first angular power pattern and the second angular power pattern below a predefined fraction of the of an angular power pattern of a single antenna element is less than the sum of an angular range of each of the third angular power pattern and the fourth angular power pattern below the predefined fraction of the angular power pattern.

7. The method of claim 1, wherein each of the first sub-array and the second sub-array comprises at least one of a linear array of the antenna elements and a two-dimensional array of the antenna elements.

8. The method of claim 1, wherein the first sub-array and the second sub-array comprise an equal number of antenna elements.

9. The method of claim 1, wherein the first function depends exclusively on the first weight vector and the second function depends exclusively on the second weight vector.

10. The method of claim 1, wherein at least one or each of the first function of the first weight vector and the second function of the second weight vector comprises an aperiodic autocorrelation function.

11. The method of claim 1, wherein the first term of the utility function comprises a p-norm of a sum of the first function and of the second function.

12. The method of claim 1, wherein the second term depends on the first weight vector and the second weight vector through either one of the first function and the second function.

13. The method of claim 1, wherein the dependence of the second term on either one of the first function and the second function changes while optimizing the utility function in dependence of the first weight vector and the second weight vector.

14. The method of claim 1, wherein the second term depends on the maximum or the minimum of a p-norm of the first function and of a p-norm of the second function.

15. The method of claim 1, wherein optimizing the utility function comprises at least one of a Great Deluge, DG, algorithm; a cyclic algorithm new for complementary sequences, CANARY; a majorization-minimization, MM, algorithm; and a simulated annealing, SA, algorithm.

16. The method of claim 1, the method further comprising:
determining the first weight vector for the first sub-array and the second weight vector for the second sub-array by optimizing the utility function.

17. A non-transitory computer readable storage medium storing a code for performing the steps of claim 1 when the code is executed on one or more computing devices.

18. A device for performing a beamformed transmission and/or a beamformed reception in a wireless communication using an antenna array comprising a first sub- array of first antenna elements each having a first polarization and a second sub-array of second antenna elements each having a second polarization that is orthogonal to the first polarization, the device comprising memory operable to store instructions and processing circuitry operable to execute the instructions, wherein the device is operative to:
obtain a first weight vector for the first sub-array of first antenna elements and a second weight vector for the second sub-array of second antenna elements, wherein the first weight vector and the second weight vector optimize a utility function, wherein the utility function comprises a first term depending on a first function of the first weight vector and on a second function of the second weight vector, and wherein the utility function further comprises a second term depending on either one of the first function and the second function; and
perform the beamformed transmission and/or beamformed reception using the obtained first weight vector for the first sub-array of first antenna elements and the obtained second weight vector for the second sub-array of second antenna elements.

\* \* \* \* \*